US011908441B1

(12) United States Patent
Kim

(10) Patent No.: US 11,908,441 B1
(45) Date of Patent: Feb. 20, 2024

(54) SYSTEM AND METHOD FOR A SPEAKING CHAMBER WITH VOICE CANCELLATION

(71) Applicant: Kevin Chong Kim, Holmdel, NJ (US)

(72) Inventor: Kevin Chong Kim, Holmdel, NJ (US)

( * ) Notice: Subject to any disclaimer, the term of this patent is extended or adjusted under 35 U.S.C. 154(b) by 0 days.

(21) Appl. No.: 18/381,852

(22) Filed: Oct. 19, 2023

(51) Int. Cl.

| | |
|---|---|
| ***H04R 3/02*** | (2006.01) |
| ***G10K 11/175*** | (2006.01) |
| ***G10K 11/162*** | (2006.01) |
| *H04R 1/02* | (2006.01) |

(52) U.S. Cl.
CPC ........ *G10K 11/1754* (2020.05); *G10K 11/162* (2013.01); *G10K 2210/1081* (2013.01); *G10K 2210/1082* (2013.01); *G10K 2210/3224* (2013.01); *G10K 2210/32121* (2013.01)

(58) Field of Classification Search
CPC ....... G10K 11/1754; G10K 2210/1081; G10K 2210/1082; G10K 2210/32121; G10K 2210/3224
USPC ................................................ 381/73.1, 333
See application file for complete search history.

(56) References Cited

U.S. PATENT DOCUMENTS

| | | | |
|---|---|---|---|
| 9,386,135 B2 | 7/2016 | Moser | |
| 9,525,765 B2 | 12/2016 | Moser | |
| 9,741,359 B2 | 8/2017 | Cheung et al. | |
| 11,539,823 B2 | 12/2022 | Yu et al. | |
| 2002/0077838 A1 | 6/2002 | Dutta | |
| 2011/0093262 A1* | 4/2011 | Wittke ............. | G10K 11/17857 704/226 |
| 2022/0247852 A1 | 8/2022 | Anvari et al. | |

OTHER PUBLICATIONS

Anonymous: "AIRXOM MG1 Mask", Retrieved from the Internet <URL:https://airxom-mask.com/en/shop-2/> [retrieved on Dec. 12, 2022].

Mike: "Bane-like Mask Turns Your Earpiece Into a Hush Hush Audio Mask", Retrieved from the Internet <URL:https://mikeshouts.com/bloxvox-voice-privacy-mouthpiece-mask/> [retrieved on Dec. 12, 2022].

(Continued)

*Primary Examiner* — Ammar T Hamid
(74) *Attorney, Agent, or Firm* — Jessica W. Smith; LOZA & LOZA, LLP

(57) ABSTRACT

A sound muffling chamber covers a nose and mouth in an airtight manner. The sound muffling chamber includes a microphone that detects vocal sound waves in the sound muffling chamber and generates a voice signal. A digital signal processing system analyzes the voice signal and generates a voice cancellation signal. A sound silencing chamber includes a speaker that generates out of phase sound waves in response to the voice cancellation signal that superimposes on and cancels the vocal sound waves. A sound decelerator is positioned between the sound muffling chamber and the sound silencing chamber and configured to increase a traveling time of the vocal sound waves such that the vocal sound waves' arrival at the sound silencing chamber may be synchronized with the arrival of a voice cancellation signal. The sound muffling chamber may include inflatable cells separated by slats such that the sound muffling chamber is foldable.

19 Claims, 15 Drawing Sheets

(56) References Cited

OTHER PUBLICATIONS

Anonymous: "Hushme Acoustic Device for Speech Privacy—Classic Frost White", Retrieved from the Internet <URL:https://ozrobotics.com/shop/hushme-acoustic-device-for-speech-privacy-classic-frost-white/> [retrieved on Dec. 12, 2022].

Irving: "Bizarre Bluetooth mouthpiece mutes speech in public places", Sep. 11, 2022, Retrieved from the Internet <URL:https://newatlas.com/wearables/mutalk-bluetooth-mouthpiece-mute-speech-public/> [retrieved on Nov. 17, 2022].

Anonymous: "Stenomask/Privacy Microphones", Retrieved from the Internet <URL:https://talktech.com/stenomask-steno-sr/#:~:text=STENOMASK %2F PRIVACY MICROPHONES, noise away from the microphone> [retrieved on Nov. 17, 2022].

* cited by examiner

FIG. 12
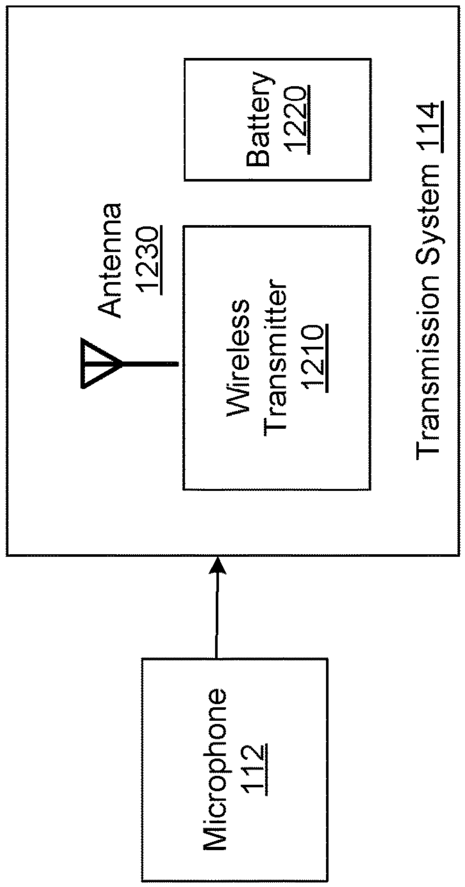
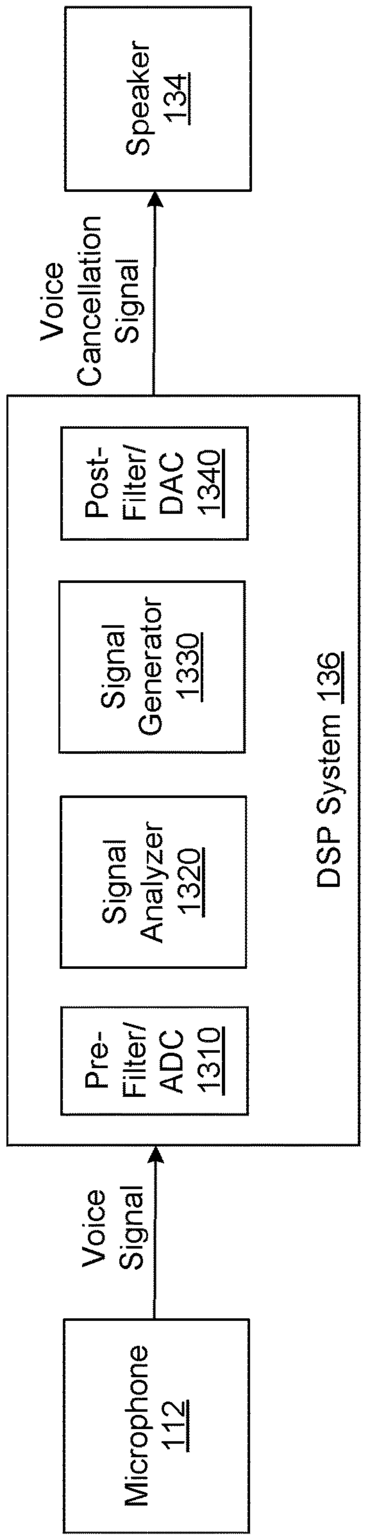
FIG. 13

SYSTEM AND METHOD FOR A SPEAKING CHAMBER WITH VOICE CANCELLATION

FIELD

This application relates to system and methods for a voice cancellation system and more particularly, to a voice cancellation system including a sound muffling chamber, a sound decelerator, and a sound cancellation system and method to limit the volume and intelligibility of a voice.

BACKGROUND

One of the most important modes of verbal communication is by a phone. The basis of this type of communication is the creation of audible vocal sounds. A user that is talking on a call produces intelligible vocal sounds which are detected by a microphone, e.g., located in the phone. At the same time, the vocal sounds from the user spread in all directions through the surrounding environment. It is this uncontrolled propagation of the vocal sounds that may present problems when the user is in the presence of other people, which occurs quite often. In fact, the presence of other people often cannot be avoided—in open-space offices, in cafes, public transport, or even at home. In these situations, the user may feel extremely uncomfortable knowing that their conversation is not private, and at the same time, the surrounding people may be annoyed by the disturbance of the conversation.

Many attempts have been made to create a device that reduces the propagation of vocal sounds further than the microphone, e.g., located on the user's phone. The underlying principle of these devices is passive voice muffling using an airtight mask that prevents leakage of air into the surrounding environment. The weaknesses with such devices are varied, the chief of which is the requirement of covering the mouth of the user in an air-tight manner, which makes it difficult, if not impossible, for the user to breathe and vocalize. Efforts to improve ventilation capacity of such airtight masks diminishes the effectiveness of the devices. Consequently, such voice muffling devices are not ideal.

Therefore, there is a need for an improved device and method that facilitates private verbal communication over a phone or other user device without causing annoyance to the public. Other and/or alternate advantages will be apparent from the description herein.

SUMMARY

In one aspect, a voice cancellation system includes a sound muffling chamber configured to cover both a nose and mouth of a user, wherein the sound muffling chamber includes soundproof material. At least one microphone is positioned in the sound muffling chamber, wherein the at least one microphone is configured to detect a voice of the user in the sound muffling chamber and generate a voice signal. A sound silencing chamber includes at least one speaker and at least one sound decelerator is fluidly coupled between the sound muffling chamber and the sound silencing chamber, wherein the sound decelerator includes material to increase a traveling time of sound waves from the sound muffling chamber to the sound silencing chamber. A signal processing system is configured to analyze the voice signal and generate a voice cancellation signal, wherein the voice cancellation signal includes one or more frequency components having a same frequency and amplitude but a 180 degrees out of phase from one or more frequency components of the voice signal.

In another aspect, a voice cancellation system includes a sound muffling chamber configured to cover both a nose and mouth of a user, wherein the sound muffling chamber includes soundproof material and at least one microphone positioned in the sound muffling chamber, wherein the at least one microphone is configured to detect voice sound waves of the user in the sound muffling chamber and generate a voice signal. A headband is coupled to the sound muffling chamber, wherein the headband includes a tubular structure configured to extends circumferentially from the sound muffling chamber over a head of the user. A sound silencing chamber positioned near an apex of the headband, wherein the sound silencing chamber includes at least one speaker. At first sound decelerator is positioned in a left side of the tubular structure of the headband, wherein the first sound decelerator is fluidly coupled between a left side of the sound muffling chamber and the sound silencing chamber. A second sound decelerator is in a right side of the tubular structure of the headband, wherein the second sound decelerator is fluidly coupled between a right side of the sound muffling chamber and the sound silencing chamber. A signal processing system is configured to analyze the analog voice signal and generate a digital voice cancellation signal, and the speaker generates analog sound waves in the sound silencing chamber in response to the digital voice cancellation signal.

BRIEF DESCRIPTION OF THE DRAWINGS

A more particular description is included below with reference to specific aspects illustrated in the appended drawings. Understanding that these drawings depict only certain aspects of the disclosure and are not therefore to be considered to be limiting of its scope, the disclosure is described and explained with additional specificity and detail through the use of the accompanying drawings described briefly below.

FIG. 12 illustrates a schematic block diagram of an embodiment of the transmission system in more detail.

FIG. 13 illustrates a schematic block diagram of an embodiment of the DSP system in more detail.

DETAILED DESCRIPTION

The word "exemplary" or "embodiment" is used herein to mean "serving as an example, instance, or illustration." Any implementation or aspect described herein as "exemplary" or as an "embodiment" is not necessarily to be construed as preferred or advantageous over other aspects of the disclosure. Likewise, the term "aspects" does not require that all aspects of the disclosure include the discussed feature, advantage, or mode of operation.

Embodiments will now be described in detail with reference to the accompanying drawings. In the following description, numerous specific details are set forth in order to provide a thorough understanding of the aspects described herein. It will be apparent, however, to one skilled in the art, that these and other aspects may be practiced without some or all of these specific details. In addition, well known steps in a method of a process may be omitted from flow diagrams presented herein in order not to obscure the aspects of the disclosure. Similarly, well known components in a device may be omitted from figures and descriptions thereof presented herein in order not to obscure the aspects of the disclosure.

In an embodiment, a voice cancellation system includes a speaking or sound muffling chamber that enhances a user's privacy and minimizes disturbance to the public. The voice cancellation system includes the following characteristics: 1. The device detects the vocal sounds created by both the nose and the mouth of the user since the clarity of the vocal sounds are lost when either organ is excluded; 2. The device includes a means for the user to inhale and exhale without limitations and without risking sound leakage; 3. The device covers the nose and the mouth in an air-tight manner; 4. The sound-barrier property of the device is robust such that leaking of vocal sounds is limited through the body of the device; 5. The device is sufficiently elastic to accommodate the facial movement and mouth opening and closing without disrupting an air-proof seal; and 6. The device is foldable to permit the user to conveniently carry it. The embodiments described herein include these advantages and/or alternate or additional advantages.

Figure 1:
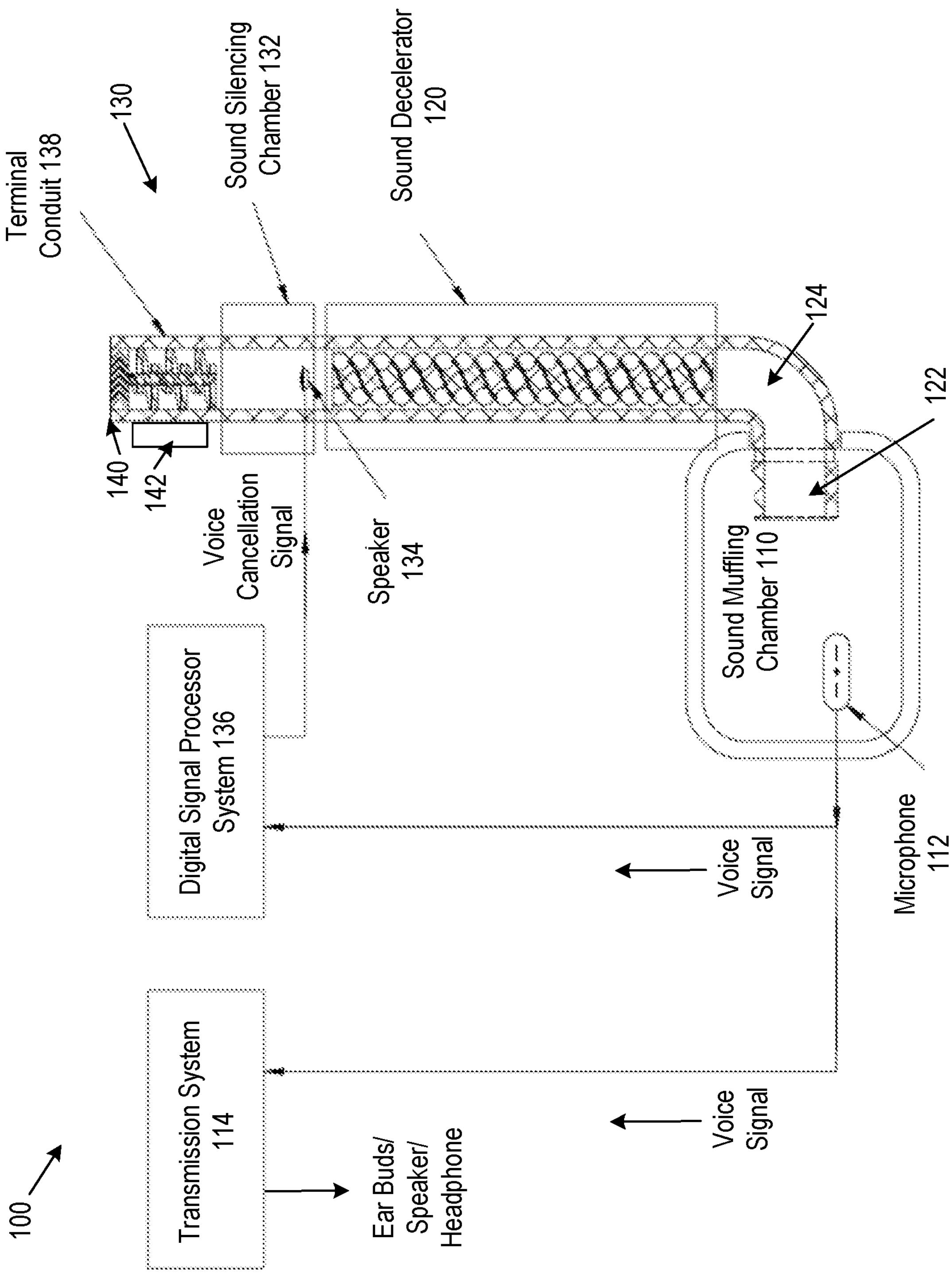
FIG. 1 illustrates a block diagram of an embodiment of a voice cancellation system including a sound muffling chamber, a sound decelerator, and sound cancellation system.

FIG. 1 illustrates a block diagram of an embodiment of a voice cancellation system 100 including a sound muffling chamber 110, a sound decelerator 120, and sound cancellation system 130. The sound muffling chamber 110 is configured to cover a nose and mouth of a user and form an airtight seal against the user's face that prevents leakage of air from the edges of the chamber 110. The sound muffling chamber 110 further includes a microphone 112 disposed within the chamber 110, preferably near the user's mouth and/or nose. The microphone 112 is configured to detect the vocal sounds created by both the nose and the mouth of the user within the sound muffling chamber 110. The microphone 112 converts the vocal sounds to a voice signal and transmits the voice signal to a transmission system 114. The transmission system 114 may include a wired or wireless transmitter and receiver configured to transmit the voice signal to a user device, such as a phone, watch, laptop, vehicle phone, vehicle sound system, voice recorder, or other processing device. The transmission system 114 may also receive transmissions from the user device, such as audio signals, data, or commands. The transmission system 114 may also transmit any audio signals, such as a voice signal of a caller and transmit the audio signals to a listening device, such as ear buds, speaker, headphone, etc.

The voice signal from the microphone 112 is also transmitted to a digital signal processor (DSP) system 136 for processing. The DSP system 136 receives the analog voice signal from the microphone 112 and generates a digital voice cancellation signal. The DSP system 136 analyzes the analog voice signal to determine a plurality of frequency components and determines an amplitude and phase of the plurality of frequency components. The DSP system 136 then generates a digital voice cancellation signal including complementary frequency components that are 180 degrees out of phase from the frequency components of the analog voice signal.

A sound outlet 122 is formed in an airtight manner in the sound muffling chamber 110. A connector tube 124 is coupled between the sound outlet 122 and the sound decelerator 120. The sound decelerator 120 includes one or more materials configured to slow a travel time of the sound waves, e.g., increase a traveling time of the sound waves from the sound muffling chamber 110 to a sound silencing chamber 132. The sound decelerator 120 provides time for the DSP system 136 to generate the voice cancellation signal.

In use, vocal sound waves emanate from the sound outlet 122, e.g., such as from the user's voice, and are slowed through the sound decelerator 120 and then guided into the sound silencing chamber 132. The sound silencing chamber 132 includes a speaker 134 that emits analog out of phase sound waves in response to the digital voice cancellation signal from the DSP system 136. In the sound silencing chamber, the out of phase sound waves from the speaker 134 superimpose on and destructively interfere with the native vocal sound waves, thereby substantially decreasing the vocal sound waves or even completely eliminating some or all the vocal sound waves. The end result is a significant reduction in loudness and intelligibility of the user's voice to the surrounding environment.

In an embodiment, a terminal conduit 138 extends from the sound silencing chamber 132 to the external environment and includes sound wave mixing and/or sound decelerator materials and a porous outlet cover. For example, the terminal conduit 138 may include a tortuous structure and/or porous sound retarding materials to help prevent transmission of external noise to the sound muffling chamber 110. The air outlet 140 allows the user to inhale and exhale without limitations and without risking leakage of intelligible speech. An external microphone 142 may also be disposed on an external wall of and/or near or within the air outlet 140 to detect external noise and/or sounds emitted from the terminal conduit 138. The detected noises and/or sounds may be transmitted to the DSP system 136 to generate a noise cancellation signal to further dampen the sounds emanating from the voice cancellation system 100.

The sound decelerator 120 includes a tortuous sound conducting conduit that is filled with porous materials. The sound decelerator 120 is between 4.5 cm to 20 cm long and made of one or more air-tight materials, such as plastics, metals, or wood. The proximal end of the sound decelerator fluidly connects to the sound muffling chamber and the distal end to the sound silencing chamber. The tortuous configuration of the sound conducting conduit may be of convoluted, zigzag, helical, spiral, wavy, labyrinthine pattern. The luminal wall of the sound conducting conduit may be of variable roughness. These features of the sound conducting conduit serve to slow the sound transmission by increasing the sound transmission distance and by elevating sound flow resistance.

The sound propagation speed in the sound conducting conduit is further modulated by the presence of porous material in the conduit lumen. Sound transmission through a porous material is principally determined by the material's density, cross-sectional area, pore tortuosity, and length of the medium. The selected material should be harmless to humans when inhaled, be resistant to moisture and microbial growth, and allow adequate air exchange. Examples of suitable filling materials include neoprene foam, polyethylene foam, graphene foam, polyolefin foam, expanded polystyrene, graphite foam, charcoal foam, and polystyrene hard foam.

Through the use of such an acoustic conduit the speed of sound transmission is sufficiently reduced, thereby providing additional time, e.g., at least the time necessary for the out of phase sound waves to be produced by the speaker 134. The slowed transmission of the vocal sound waves of the user through the sound decelerator 120, then, makes it possible for the vocal sound waves and the out of phase sound waves from the speaker 134 to be present simultaneously at the sound silencing chamber 132. When excess time is provided by the sound decelerator 120, the DSP system 136 may delay transmitting the voice cancellation signal or otherwise synchronize the generation of the anti-phase sound waves to the arrival of the voice sound waves.

Figure 2:
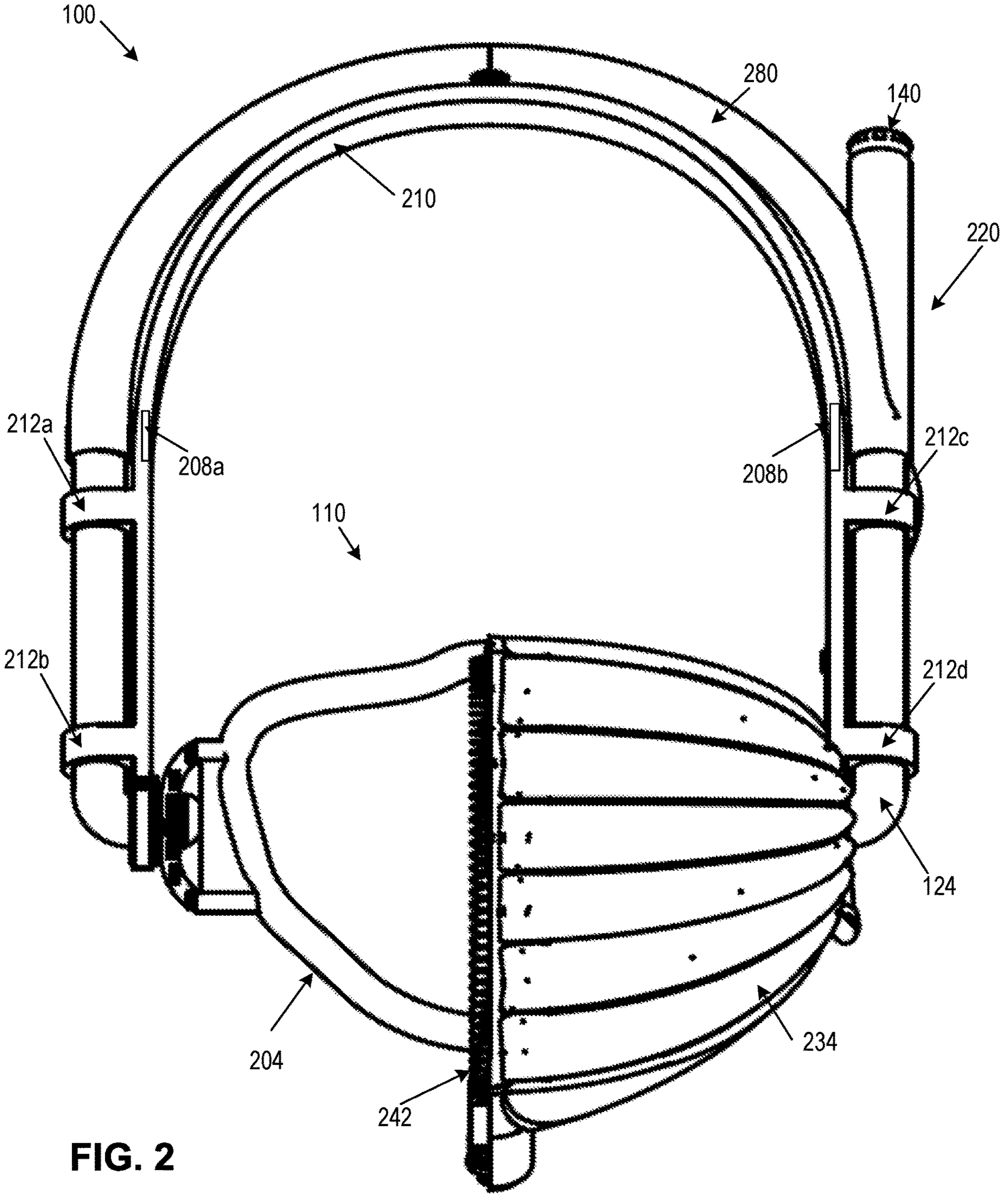
FIG. 2 illustrates a front perspective view of an embodiment of the voice cancellation system.
Figure 3:
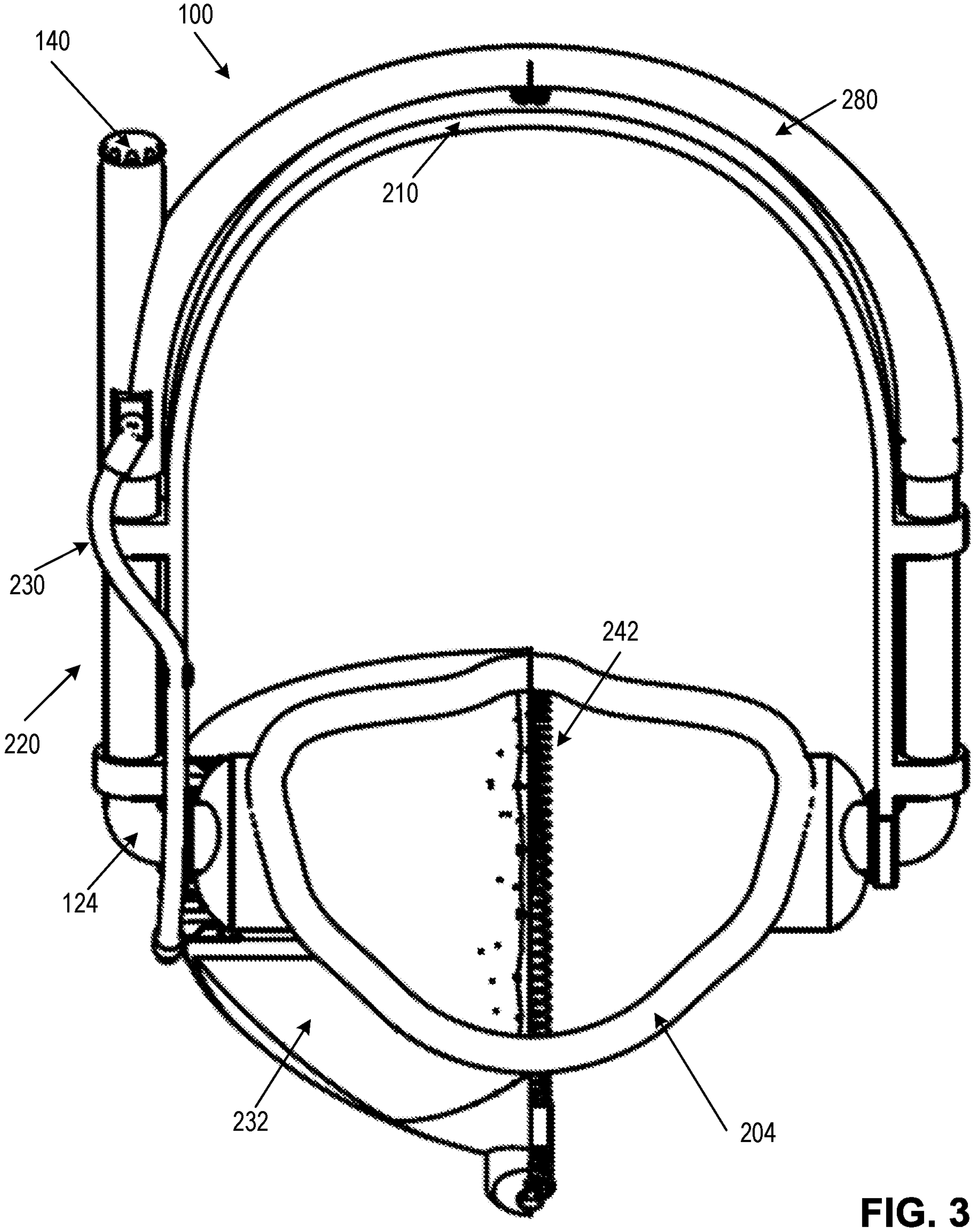
FIG. 3 illustrates a front perspective view of an embodiment of the voice cancellation system.

Disposed at both ends of the sound decelerator 120 is sound absorbing material. Sound absorbing materials that meet the above specification include Neoprene foam, polyethylene foam, graphene foam, polyolefin foam, expanded polystyrene, graphite foam, charcoal foam, polystyrene hard foam. The presence of the sound absorbing material helps to absorb any reflected sounds at the proximal opening of the sound decelerator 120 and further slow the forward sound transmission. The presence of the sound absorbing material at the distal end of the sound decelerator 120 serves to further retard the speed of the sound transmission and helps to reduce the retrograde transmission of sounds, whether it be external or residual sounds post destructive interference. The internal surface of the sound wave conducting tubes may be further lined with materials that may increase the sound flow resistance, such as fabric, granules, or other suitable material. The distal end of the sound decelerator 120 is configured to couple with the sound silencing chamber 132. The voice cancellation system 100 thus muffles the voice of the user and ensures unintelligibility of the conversation of the user to the external environment. In addition, the voice cancellation system 100 provides sufficient airflow to the user while covering both the nose and mouth of the user. FIGS. 2 and 3 illustrate perspective views of an embodiment of the voice cancellation system 100, wherein FIG. 2 illustrates a front perspective view and FIG. 3 illustrates a back perspective view. Referring to both FIGS. 2-3, the voice cancellation system 100 is configured to be worn on the head of a user with the sound muffling chamber 110 fitted over the mouth and nose. Including the nose within the sound muffling chamber 110 is of paramount importance for the user's voice to sound normal. When the nose is excluded, the user's voice may be perceived as being "nasal" and can be annoying to the listener.

In one embodiment, the sound muffling chamber 110 includes a left portion and a right portion that intersect at a centrally located spring 242. In FIGS. 2 and 3, only the left portion (e.g., the portion worn on a left side of the user's face) is shown to better illustrate the structure of the sound muffling chamber 110. The overall shape of the sound muffling chamber 110 is spherical in the longitudinal axis and parabolic in the transverse axis. This configuration permits sufficient space in front of the user's nose and the mouth for the comfort of the user.

In contrast to the previous art, the sound muffling chamber 110 does not have a "vent" that will cause leakage of the user's voice. In an embodiment, the sound muffling chamber 110 has no vent or opening that directly communicates with the ambient atmosphere. Instead, on at least one side of the sound muffling chamber 110, the sound outlet 122 fluidly connects with an elbow-shaped connector tube 124, to a proximal end of a sound egress channel 220. An opposing, distal end of the sound egress channel 220 forms the sound outlet port 140. Between the proximal and distal ends, the sound egress channel 220, in one example, includes, e.g., the sound decelerator 120, the silencing chamber 132, and/or the terminal conduit 138. Therefore, in this example, the air to and from the sound muffling chamber 110 must flow through the sound decelerator 120, sound silencing chamber 132 and terminal conduit 138.

The sound egress channel 220 is supported by an inner headband 210 that extends circumferentially around the top of the head. The inner headband 210 may include one or more brackets **212*a-d* that hold the sound egress channel 220 and/or other components of the voice cancellation system 100. A tubular, outer headband 280 may be attached to the inner headband 210 and/or the sound silencing chamber 132 and is configured to fit circumferentially around the headband 210**.

The sound muffling chamber 110 includes an external wall 234 and an internal wall 232 that help form an airtight enclosure that provides sound insulation. The external wall 234 and internal wall 232 may each include one or more layers of soundproofing materials or insulation. In an embodiment, the sound muffling chamber 110 may include one or more inflatable layers, as described in more detail hereinbelow. The voice cancellation system 100 may further include an air inlet pipe 230 that provides a fluid connection to the interior space of the sound muffling chamber 110 for inflation and deflation of the one or more inflatable layers. These inflatable layers and the spring 242 enable folding of the sound muffling chamber 110 for easier carrying of the voice cancellation system 100 when not in use.

The lateral body of the sound muffling chamber 110 includes an opening that receives the sound egress channel 220. The connection is made rotatable and sound insulated by means of a threaded coupling. The lumen of the sound sound egress channel 220, e.g., including the sound decelerator 120 and sound silencing chamber 132, is thus in fluid connection with the mask chamber.

The transmission system 114 provides a wireless or wired connection between the voice cancellation system 100 and the user's device and may be disposed in the inner headband 210 or in an isolated segment of the outer headband 280. The transmission system 114 may also provide a wireless or wired connection to one or more listening devices, **208*a,b*, such as speakers, earbuds, headphones, or other devices, that are attached to or integrated with the voice cancellation system 100**.

Figure 4:
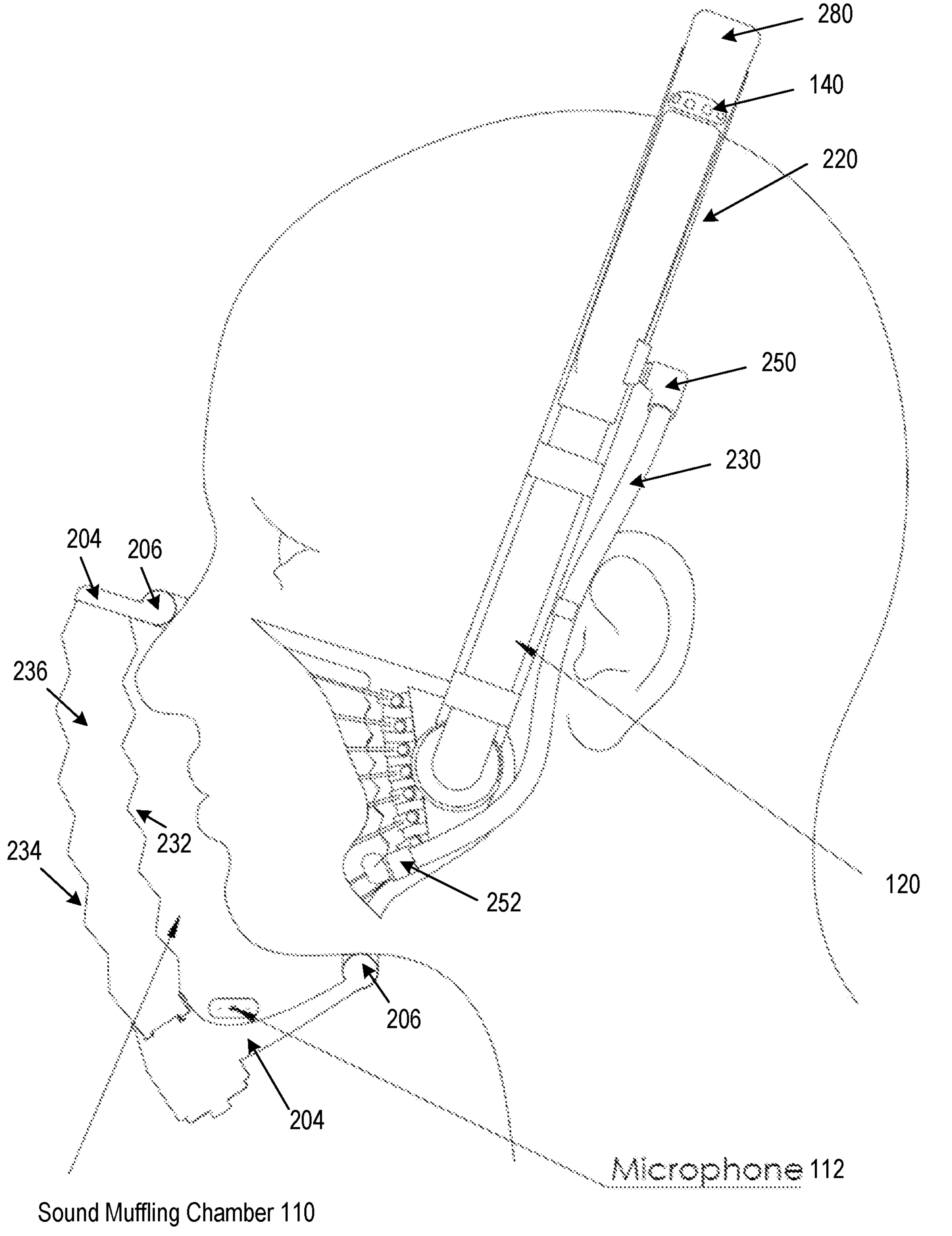
FIG. 4 illustrates a illustrates a side perspective view of an embodiment of the voice cancellation system on a user.

FIG. 4 illustrates a side perspective view of an embodiment of the voice cancellation system 100 on a user. The rim 204 surrounds the sound muffling chamber 110 circumferentially and is made of a rigid material, such as a plastic and/or metal, and provides structural stability to the sound muffling chamber 110. When worn, an inferior portion of the rim 206 is designed to run along the mandible, and the left and right side of the rim 204 extends on the left and right side of the cheeks, respectively. The upper portion of the rim 204 runs along the middle of the cheek laterally and over the bridge of the nose medially.

The inner rim 206 of the sound muffling chamber 110 is ergonomically contoured to fit naturally over the lower face and the nose and is padded with a soft material to enhance the comfort for the user. The padding material is selected to optimize the skin contact, hence the sound proofing of the sound muffling chamber 110. The inner rim 206 with the padding material is sufficiently elastic to accommodate the facial movement and mouth opening and closing without disrupting an air-proof seal to the skin. For the remainder of the sound muffling chamber 110, the contour of the mask can in general follow the contour of the face. In fact, it is advantageous in the periphery circumferentially to create air proof contact so that there's no speech or voice sounds leaked or ingress of external noise.

The air inlet pipe 230 is attached to the inner headband 210 and/or outer headband 280 and includes, at an inferior end, an inlet port 252 that provides a fluid connection to the interior space 236 of the sound muffling chamber 110. At a superior end, the air inlet pipe 230 includes an air inlet valve 250 that may be opened and closed for inflation and deflation of the one or more inflatable layers 260 of the sound muffling chamber 110. A pump or other air source may be attached to the air inlet valve 250 to insert air into the interior space 236 of the sound muffling chamber 110. In an open position, the air inlet valve 250 fluidly couples the air inlet pipe 230 to an air source and in a closed position, fluidly closes or decouples the air inlet pipe from the air source.

Figure 5:
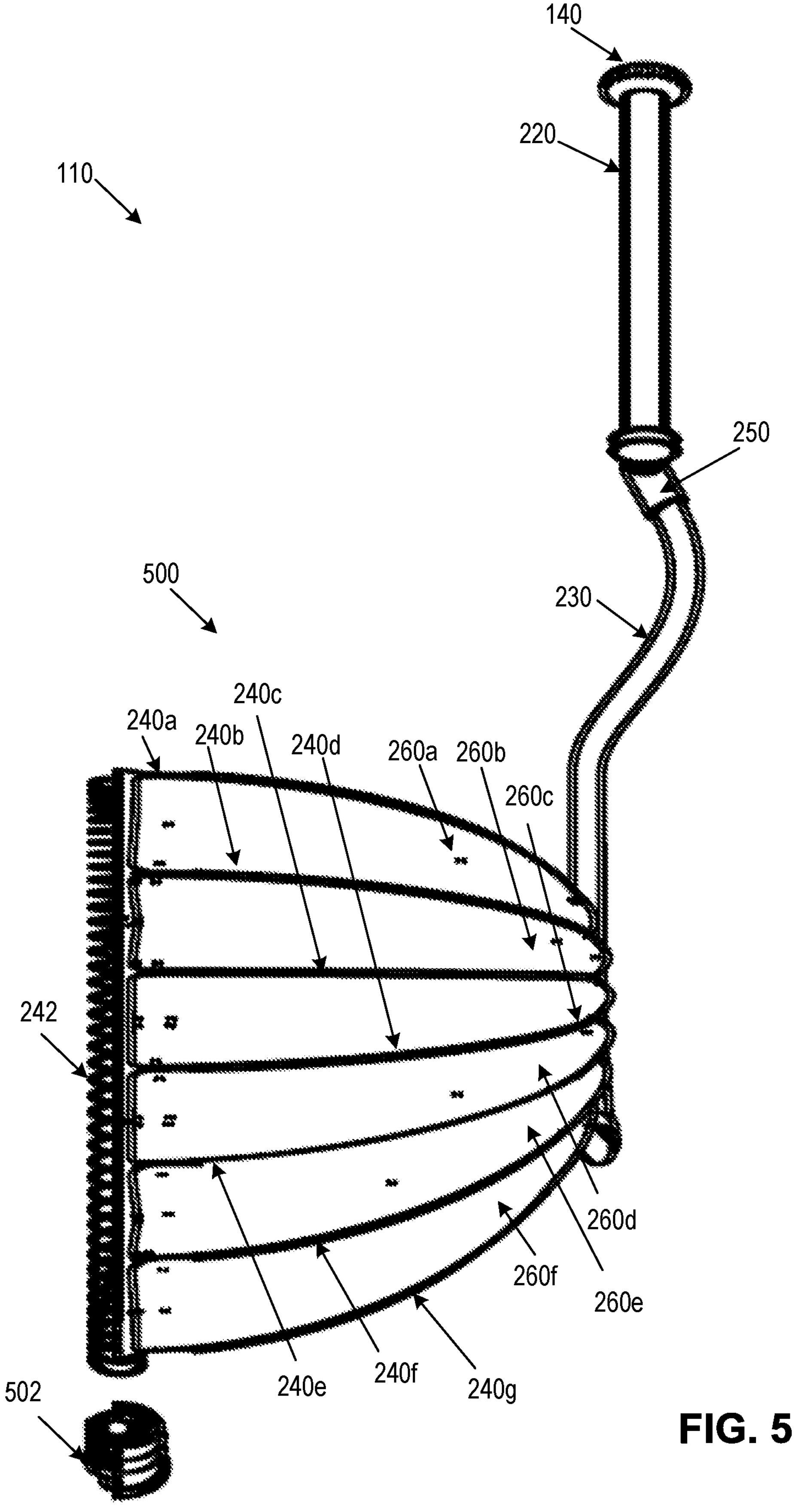
FIG. 5 illustrates a front perspective view of an embodiment of a right half of the sound muffling chamber.
Figure 6:
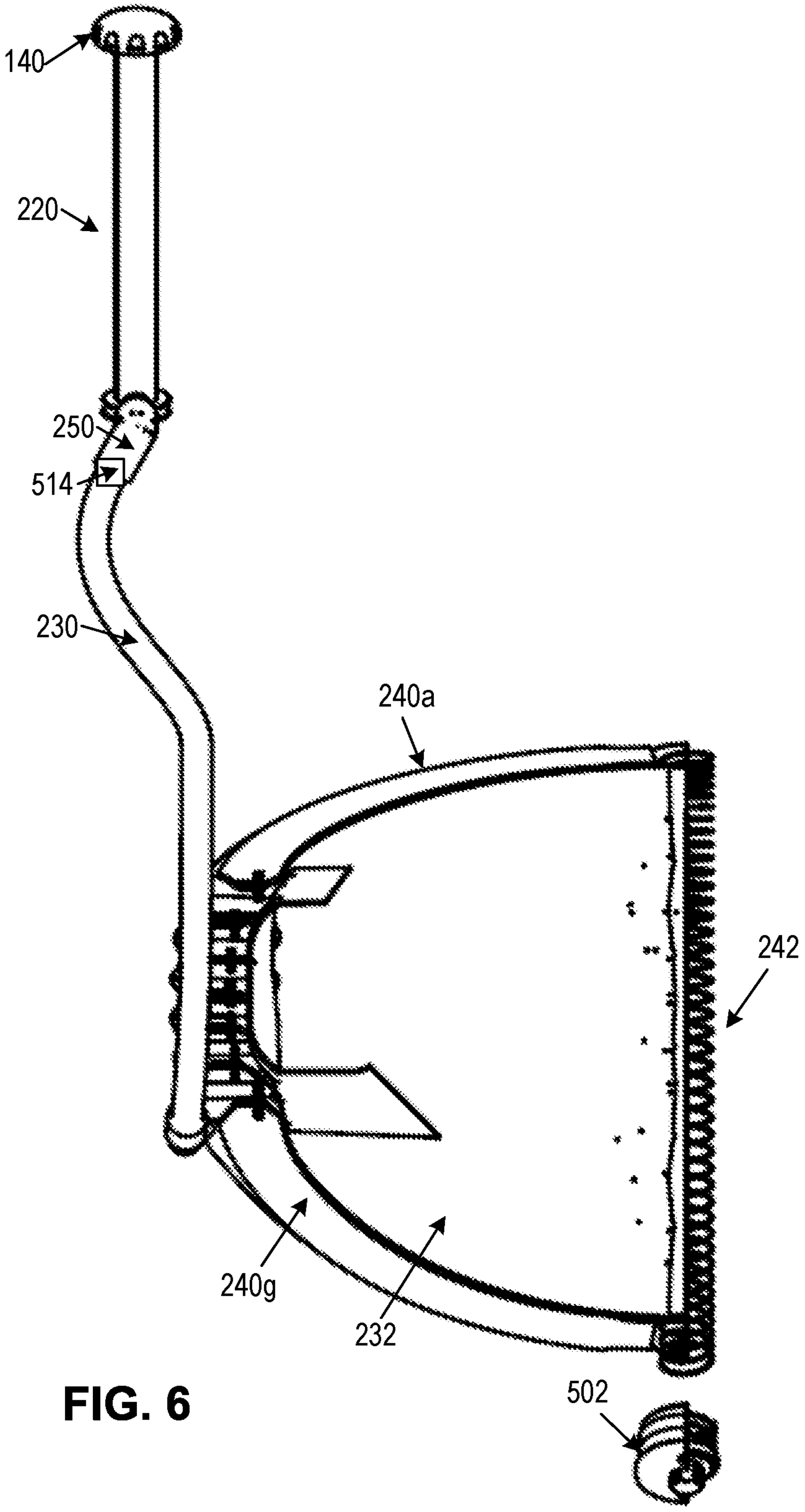
FIG. 6 illustrates a back perspective view of an embodiment of the right half of the sound muffling chamber.
Figure 7:
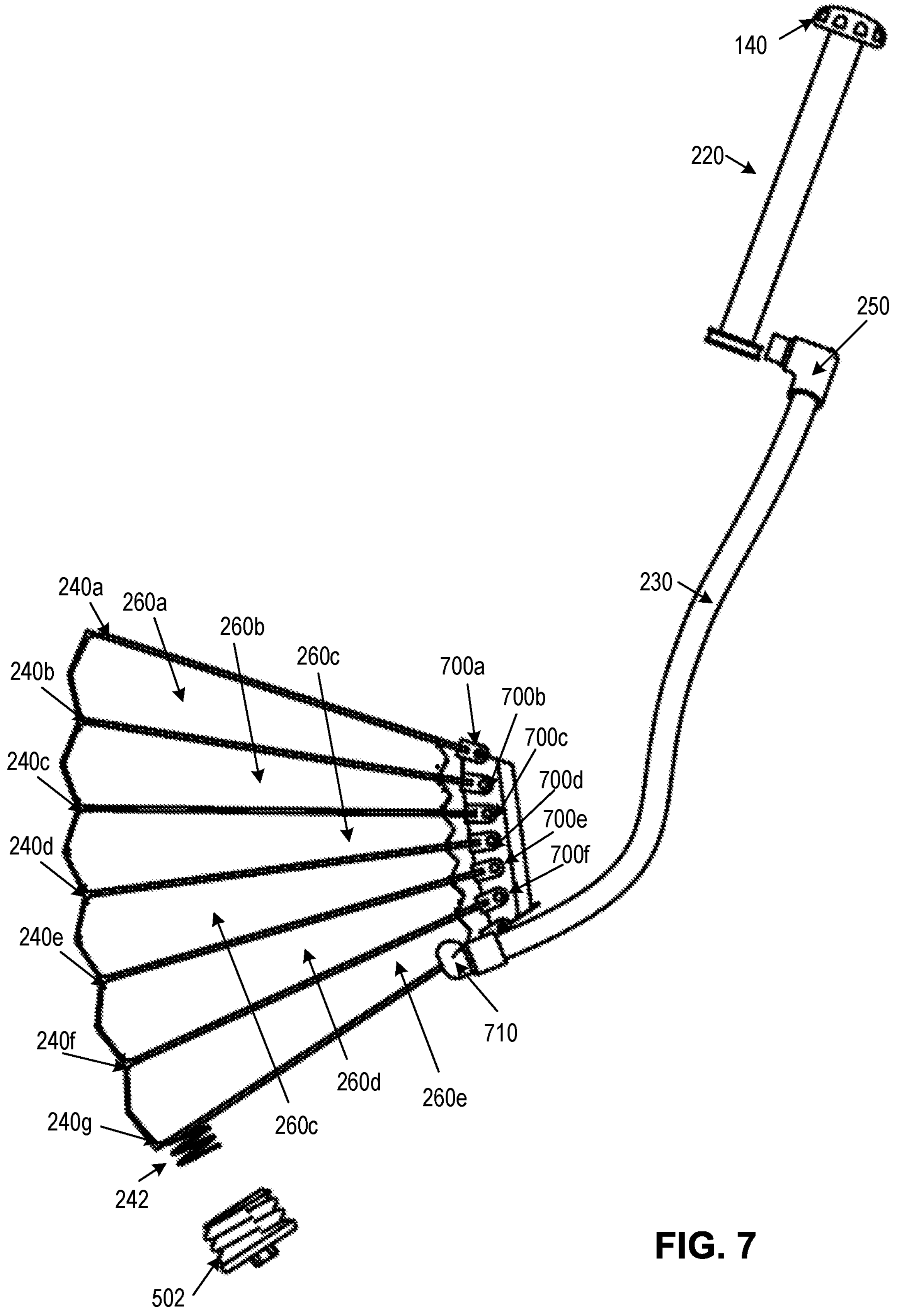
FIG. 7 illustrates a side perspective view of an embodiment of the right half of the sound muffling chamber.

FIGS. 5-7 illustrate the inflatable layers 260*a*-*f* of the sound muffling chamber 110 in more detail, wherein FIG. 5 illustrates a front perspective view of a right half of the sound muffling chamber 110, FIG. 6 illustrates a back perspective view of the right half of the sound muffling chamber 110, and FIG. 7 illustrates a side perspective view of the right half of the sound muffling chamber 110. In an embodiment, the sound muffling chamber 110 includes a plurality of inflatable layers 260*a*-*f*, a plurality of slats 240*a*-*g*, and a central spring 242. The overall shape of the sound muffling chamber 110 is created by the plurality of slats 240*a*-*g* that extend the width of the sound muffling chamber 110. The slats 240*a*-*g* provide structural support to the body 500 of the sound muffling chamber 110 and run in the transverse axis from a left side of the rim 204 to the central spring 242 and from a right side of the rim 204 to the central spring 242. Each of the inflatable layers 260*a*-*f* is positioned between and supported by a different pair of slats 240*a*-*g*. In this example, the sound muffling chamber 110 includes six inflatable layers 260*a*-*f* and seven slats 240*a*-*g*. However, in other exemplary embodiments, the sound muffling chamber 110 may include more or less inflatable layers 260*a*-*f* and/or slats 240*a*-*g*.

The center section of the sound muffling chamber 110 comprises a vertically oriented compression spring 242 that extends the whole vertical length of the sound muffling chamber 110 and is centrally positioned to the slats 240*a*-*g*. The superior end of the spring 242 is secured to a top plate by a locking member and the inferior end of the spring 242 is secured to a bottom plate by a locking member 502. The locking member 502 may be engaged or disengaged to lock and unlock the spring 242. When in an unlocked state, the spring 242 is vertically compressed and so compresses the plurality of slats 240*a*-*g* together. The plurality of inflatable layers 260*a*-*f* are deflated and folded between the plurality of slats 240*a*-*g*. When locked in an extended state, the spring 242 is expanded and pushes the plurality of slats 240*a*-*g* apart. The plurality of inflatable layers 260*a*-*f* may be inflated to extend between the plurality of slats.

To inflate the plurality of layers 260*a*-*f*, the air inlet valve 250 of the air inlet pipe 230 is opened. A pump or other mechanism may be connected to the air inlet valve 250 and used to pump air into the air inlet pipe 230. The air flows, e.g., from an air pump or other source, from the air inlet pipe 230 into the inlet port 252 that provides a fluid connection to the plurality of inflatable layers 260*a*-*f* in the sound muffling chamber 110. The inflatable layers 260*a*-*n* expand in response to the pressure of the pumped air. A pressure gauge 514 may be located, e.g., on the air inlet pipe 230 or air inlet valve 250, and used to determine a pressure in the inflatable layers 260*a*-*f*. The inflatable layers 260*a*-*f* may be inflated to a predetermined pressure or pressure range. To maintain the proper air pressure in the inflatable layers 260*a*-*f*, the elements of the body 500 of the sound muffling chamber 110 are assembled hermetically. When inflated, the material and thickness of the plurality of inflatable layers 260*a*-*n* help to provide an effective sound barrier.

For deflation, the air inlet valve 250 is opened, and the central spring 242 is unlocked such that the slats 240*a*-*g* are compressed toward each other. A lock mechanism (not shown) may be implemented to engage and lock the superior and inferior ends of the central spring 242 into a compressed state. This compression of the central spring 242 also compresses the inflatable layers 260*a*-*n* and forces the egress of air from the air inlet pipe 230. As air is released, the inflatable layers 260*a*-*n* fold inside the plurality of slats 240*a*-*g*. The size of the body 500 of the sound muffling chamber 110 is thus decreased, and so the voice cancellation system 100 is more convenient to carry, e.g., around the neck of the user or in a backpack.

The longitudinally expandable property of the sound muffling chamber 110 serves another important function. It allows the user to easily open and close their mouth when talking without dislodging the sound muffling chamber 110 from its proper position. Without this expandable property, the position of the sound muffling chamber 110 may be forced out of alignment to accommodate the closing and opening of the mouth. With such an unstable contact between the mask and the face, there is a strong possibility of sound leaking, which is less than ideal. Thus, the sound muffling chamber 110 in this embodiment is expandable in the longitudinal axis at least by the same magnitude as the mouth opening. This expansion allows the contact between the sound muffling chamber 110 and the face to remain properly aligned and the air-proof property can be maintained during speaking. In addition, the skin-contacting inner rim 206 is lined with soft non-porous material to effect an airtight sealing.

As shown in FIG. 7, at the lateral ends, the slats 240*a*-*n* are attached to the lateral rim 204 via coupling members 700*a*-*f*. The coupling members 700*a*-*f* are swivably attached to the lateral rim via rivets. This connection enables the slats 240*a*-*n* to swivel during inflation and deflation of the inflatable layers 260*a*-*n* and during movement of the user's mouth.

The sound muffling chamber 110 may also include an exterior wall 234 and an interior wall 232 that enclose the slats 240*a*-*g* and the inflatable layers 260*a*-*f* and form part of the air-tight enclosure of the sound muffling chamber 110. The exterior wall 234 and the interior wall 232 may comprise multiple layers of sound-absorbing material, such as fabric or foam made from natural and synthetic materials, intermixed with a non-porous sound reflecting layer that may be derived from polymers, silicone, or rubber. The interior wall 232 of the sound muffling chamber 110 may be lined or coated with a sound-absorbing material to create an anechoic chamber. For example, the interior wall 232 may include a sound absorbing layer or coat, such as acoustic paint, fabric, or fibers. The outermost wall 234 of the inflatable layers 260*a-n* may be further reinforced with a decorative layer or sound barrier materials. Both the inner and outer walls of the sound muffling chamber 110 span the entire height of the mask body and are hermetically affixed/bonded to the inner surface and outer surface of the slats 240*a-n*, respectively.

Figure 8A:
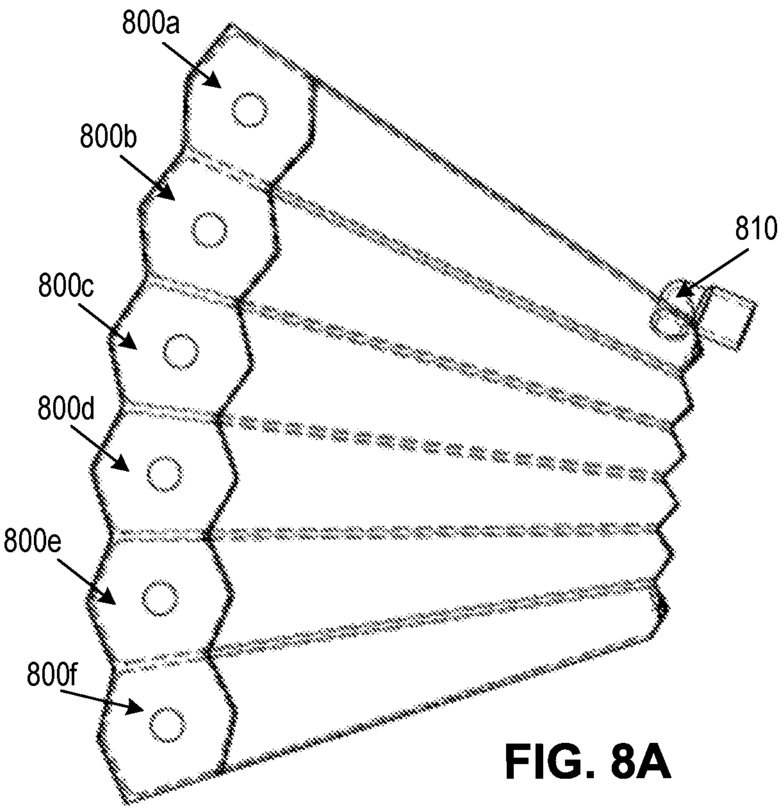
FIGS. 8A and 8B illustrate perspective views of an embodiment of the inflatable layers in more detail.
Figure 8B:
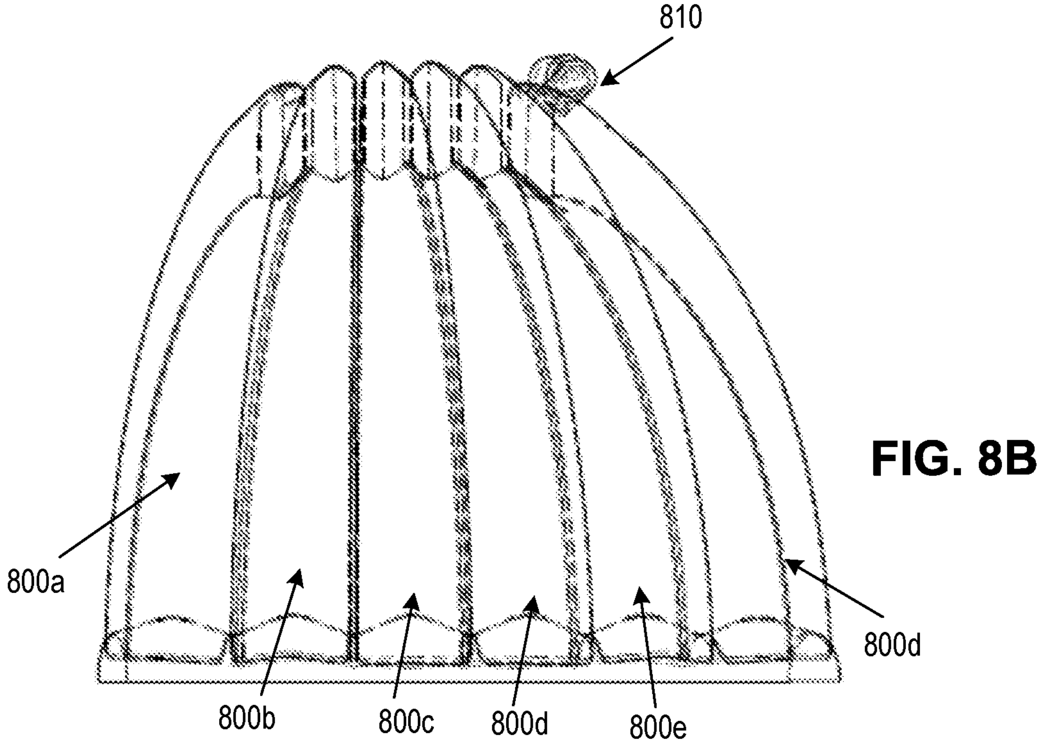

FIGS. 8A and 8B illustrate perspective views of an embodiment of the inflatable layers 260*a-n* in more detail, wherein FIG. 8A illustrates a bottom perspective view and FIG. 8B illustrates a front perspective view of the inflatable layers 260*a-n*. The sound barrier in the sound muffling chamber 110 is created by the multiple inflatable layers 260*a-n* of sound blocking materials. In an embodiment, the inflatable layers 260*a-n* comprise longitudinally expandable, transversely oriented, honeycomb-shaped air cells (honeycomb cells) 800*a-f* that span the entire horizontal width of the body 500 of the sound muffling chamber 110. The height of each honeycomb cell 800*a-f* tapers from the central section to the lateral rim 204 of the sound muffling chamber 110. The height of a honeycomb cell 800*a-f* at the central portion may range between 10 mm to 30 mm and the height of the honeycomb cell 800*a-f* laterally may range between 2 mm to 10 mm. Each of the interposing inflatable layers 206*a-n* measures 5 mm to 15 mm in the anterior to posterior direction. Honeycomb cells 800*a-f* taper in the medial to lateral direction where the lateral dimension is ⅓ to ½ of the medial dimension. The honeycomb shaped cells 800*a-f* include openings such that the inflatable layers 260*a-f* are fluidly coupled for inflation and deflation.

The honeycomb cells 800*a-f* may be in the inflated state or deflated state. In the inflated state, the honeycomb cells in the inflatable layers 206*a-n* expand the cell space, thereby enhancing the sound barrier capability. The cross section of a honeycomb cell 800*a-f* takes on an irregular hexagonal shape with two opposing faces being much longer than the other four faces. These two faces form the superior and inferior surface of an inflatable honeycomb cell. By means of rivets, an adhesive, a plurality of screws, or other attachment means, one of the two longer faces of each honeycomb cell 800*a-f* affixes to the superior face of a lower, contiguous slat 240*a-f* and the opposing face affixes to the inferior face of an upper, contiguous slat 240*a-f*. The posterior side of the honeycomb cells 800*a-f* are hermetically attached to the inner wall 232 of the sound muffling chamber 110 by means of rivets, an adhesive, a plurality of screws, or other attachment means. Utilizing a similar means, the anterior surface of the honeycomb cell 800*a-f* are hermetically attached to the outer wall 234 of the sound muffling chamber 110.

The outer 234 and inner wall 232 and honeycomb cells 800*a-f* form a triple-layered structure. The honeycomb cells 800*a-f* may comprise thin, non-porous, thermoplastic film(s), such as high density polyethylene (HDPE), polypropylene(PP), polycarbonate (PC), polyvinyl chloride (PVC), polyethylene terephthalate (PET), polyvinylidene chloride (PVDC), and polyamide (PA), poly(vinylidene chloride) (PVDC), poly(vinyl alcohol) (PVOH), or other suitable material. One of the main functions of the honeycomb cells 800*a-f* is to block the transmission of the user's voice. The outer 234 and inner wall 232 of the honeycomb cells 800*a-f* include sound-absorbing and sound-nonreflective, porous or non-porous fabric, foam, or a perforated film layer.

Each of the honeycomb cells 800*a-f* is made with creases on all six edges to facilitate a folding assembly. At the lateral end, each honeycomb cell 800*a-f* ends in a hexagonal blind pouch with creases created thereof. Creases are on the central layer of both the inner and outer sound barrier structure before the flanking layers are bonded. The created creases are precisely designed to align with the honeycomb creases. Creases may or may not be created on the flanking layer. Once creases are created, the central layer and the flanking layers are bonded together. The bonding material remains elastic after it cures. The same bonding material is used to bond the honeycomb cells 800*a-f* to the mask frame.

The honeycomb cells 800*a-f* become deflated when the air is released. This deflating procedure is achieved by means of opening the air inlet valve 250 and compressing the central spring 242. In the deflated state, the adjacent honeycomb cells 800*a-f* are collapsed on to each other, and the overall dimension of the sound muffling chamber 110 is substantially reduced, making it easier for the user to carry, e.g., around the neck or in a backpack.

Figure 9B:
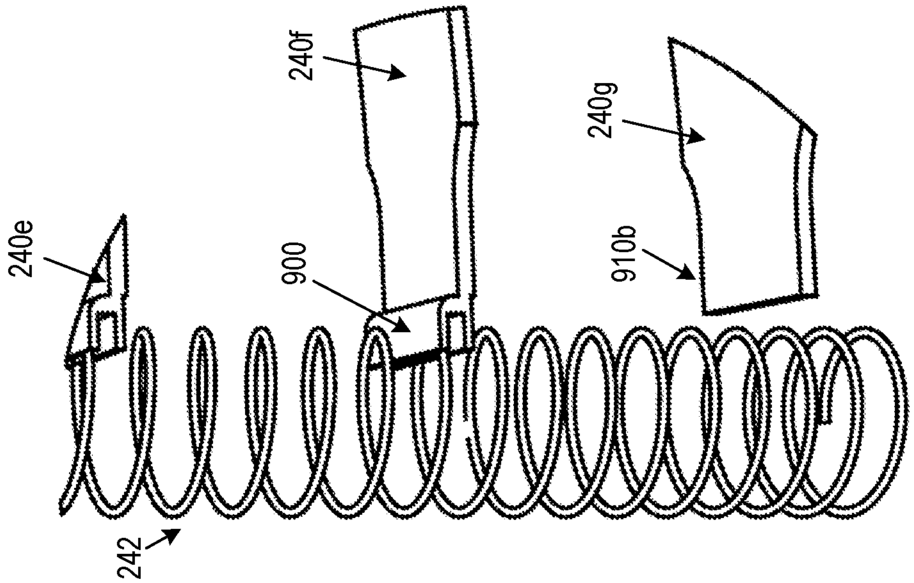
FIGS. 9A and 9B illustrate perspective views of an embodiment of the slats and the spring of the sound muffling chamber in more detail.
Figure 9A:
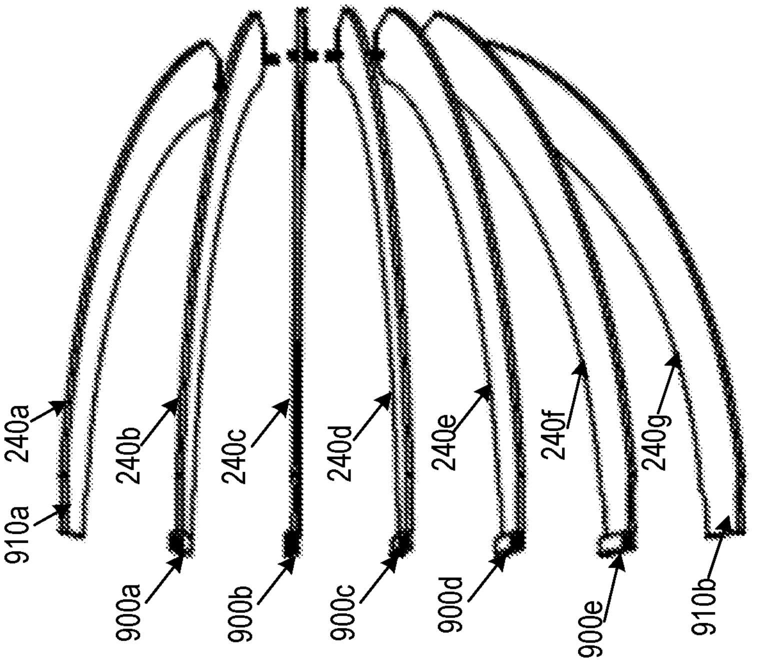

FIGS. 9A and 9B illustrate perspective views of an embodiment of the slats 240*a-g* and the spring 242 of the sound muffling chamber 110 in more detail. The slats 240*a-g* include a plurality of thin rectangular members made with rigid and lightweight materials (such as polymers, graphite, woods, metals, or other suitable material). The height of each slat 240*a-g* ranges between 0.1 mm to 5 mm. Each slat 240*a-g* attaches to the superior face of a lower honeycomb cell 800*a-e* and an inferior face of an upper, contiguous honeycomb cell 800*a-f*. In this way, each honeycomb cells 800*a-f* is connected to an adjacent honeycomb cells 800*a-f* using the slats 240*a-g*.

In one embodiment, one or more of the slats 240*a-g* extend from a lateral side of the rim 204 to the spring 242. For example, in a right portion of the sound muffling chamber 110, the medial slats 240*b-f* shown in FIG. 9A extend from the right lateral rim 204 to at least the spring 242 in a central section of the sound muffling chamber 110. An edge of each of the medial slats 240*b-f* forms a notch 900*a-e* to accept a lateral half of a turn of the spring 242.

In an embodiment, the top slat 240*a* and the bottom slat 240*g* extend the length of the sound muffling chamber 110, e.g., from the left lateral rim 204 to a right lateral rim 204. The top and bottom slats 240*a,g* each include a notched or thinner medial portion 910*a,b* that extends through a space between two coils of the spring 242. The top and bottom slats 240*a,g* are thus configured to extend lengthwise through the spring 242 while the medial slats 240*b-f* (in both the right and left portions of the sound muffling chamber 110) extend to and end at the spring 242.

In other embodiments, all of the slats 240*a-g* may extend lengthwise through the spring 242 and across the width of the sound muffling chamber 110 and/or all of the slats 240-*a-g* may extend from a lateral side of the rim 204 and end at the spring 242 and/or any combination of the two embodiments. The honeycomb cells 800*a-f* need to be modified depending on the embodiment of the slats 240*a-g*.

Figure 10A:
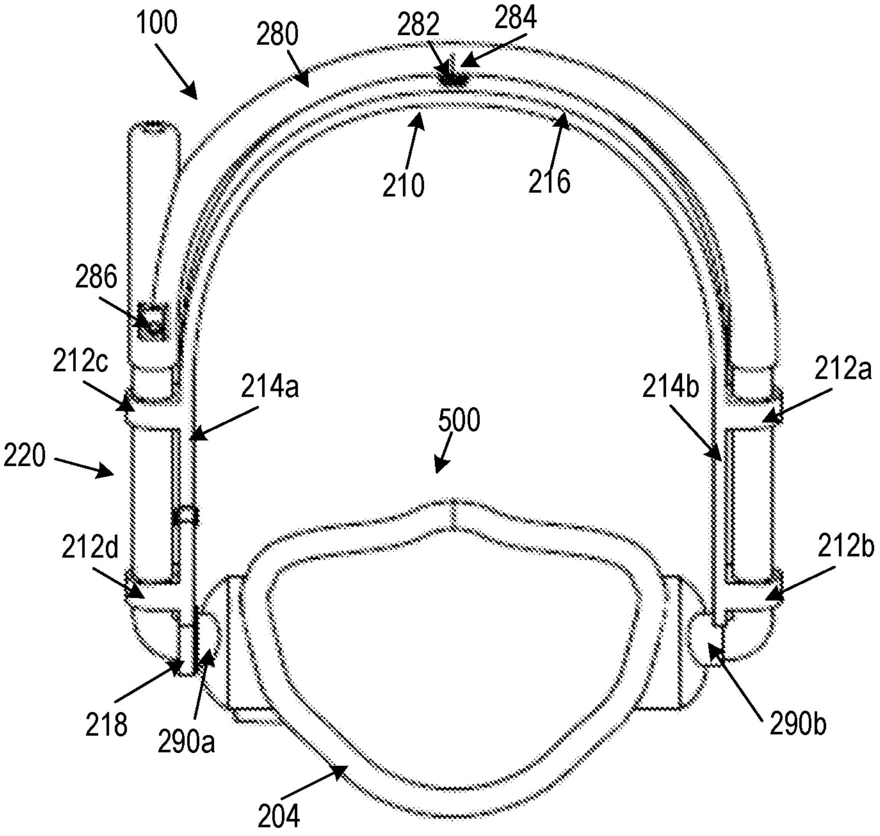
FIGS. 10A and 10B illustrate perspective views of an embodiment of the headband in more detail.
Figure 10B:
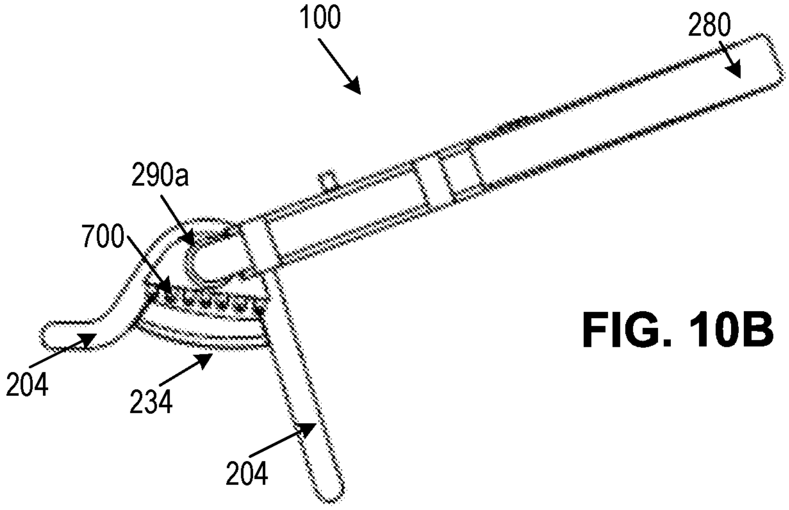

FIGS. 10A-B illustrate perspective views of an embodiment of the headband in more detail. The inner headband 210 is attached to the outer headband 280 by the one or more clasps 212*a-d*. The outer headband 280 is rotatably attached to the lateral body of the sound muffling chamber 110 at a right base 290*a* and a left base 290*b* such that the outer headband 280 and inner headband 210 rotate between 90 degrees to 180 degrees from a horizontal plane with respect to the sound muffling chamber 110. When in use, the outer headband 280 may be positioned at approximately 90 degrees from a horizontal plane to fit over the head of a user. When not in use, the outer headband 280 may be rotated to approximately 180 degrees.

The rotation of the outer headband 280 may be limited by a rotation-stopping mechanism 284 positioned on an apex of the inner headband 210 and connected to the outer headband 280, e.g., by a compression spring 282. The inner headband 210 is similarly shaped as the outer headband 280 and includes a first vertical lateral member 214*a* and second vertical lateral member 216*a* and hemi-circular top member 216 that connects to the vertical lateral members 214*a,b*. The base of at least one of the vertical lateral members 214*a,b* forms saw-tooth ridges that are designed to mate with saw-tooth ridges formed on the right base 290*a* and/or left base 290*b* of the lateral body 500. When the inner headband 210 is pulled close to the outer headband 280, the inner headband base 218 is disengaged from the lateral body 500, rendering it free to rotate. When the inner headband 210 is released from the outer headband 280, the base of the inner headband 210 locks via the saw-tooth engagement members. The inner headband apex is configured to stably interface with the crown of the user's head.

Figure 11A:
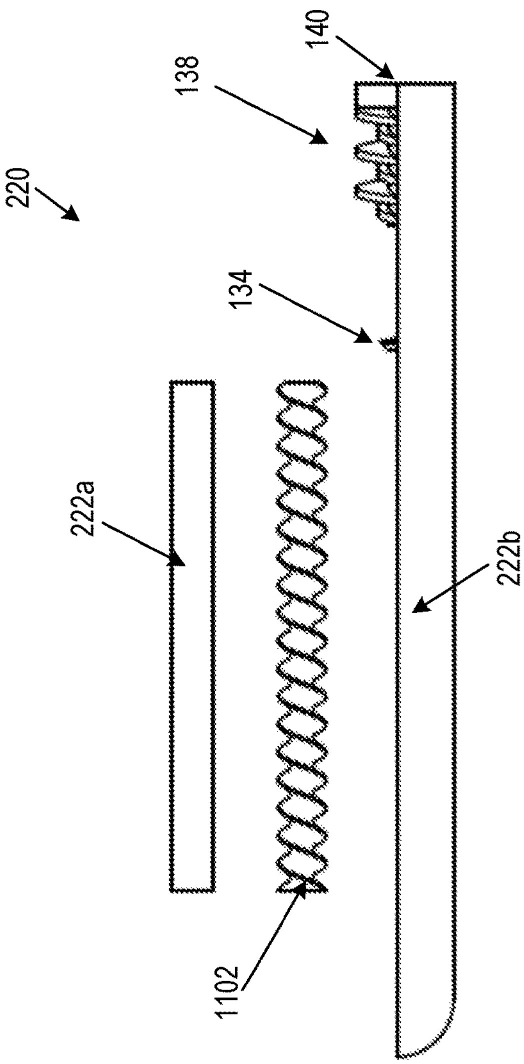
FIGS. 11A and 11B illustrate embodiments of the sound egress channel in more detail.
Figure 11B:
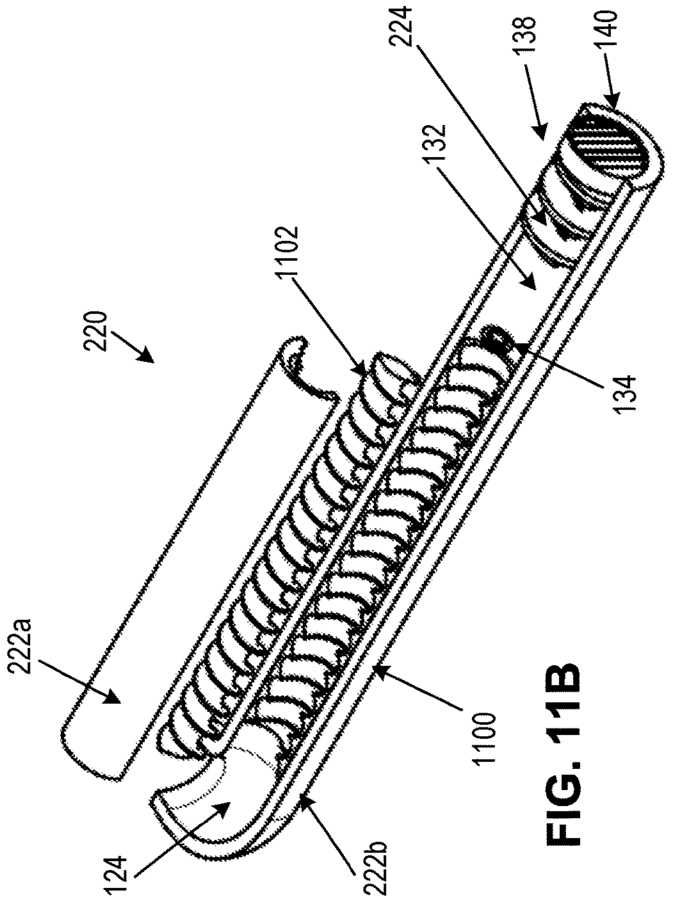

FIGS. 11A and 11B illustrate embodiments of the sound egress channel 220 in more detail, wherein FIG. 11A illustrates a side exploded view of components of the sound egress channel 220 and FIG. 11B illustrates a perspective exploded view of components of the sound egress channel 220.

In use, the sound waves from the user's voice enter the outlet port 122 from the sound muffling chamber 110, are slowed through the sound decelerator 120, and then guided into the sound silencing chamber 132. The sound silencing chamber 132 includes a speaker 134 that emits out of phase sound waves in response to the voice cancellation signal from the DSP system 136. The out of phase sound waves are superimposed and allowed to destructively interfere to reduce amplitude or eliminate the vocal sound waves of the user's voice. The mixed sound waves travel through the terminal conduit 138 and exit from the air outlet port 140. The terminal conduit 138 may also include a sound decelerator 224 to slow the exit of the mixed sound waves and/or slow or inhibit the entry of external noises.

FIG. 12 illustrates a schematic block diagram of an embodiment of the transmission system 114 in more detail. The microphone 112 is disposed in the interior of the sound muffling chamber 110 to detect the user's voice, which is then transmitted to the transmission system 114. The transmission system 114 includes, e.g., a wireless transmitter circuit 1210, such as Bluetooth transmitter circuit or other short-link radio technology. In another embodiment, a wired transmitter and auxiliary cables may be implemented. The wireless transmitter 1210 is coupled to a battery 1220 and an antenna 1230 and transmits to one or more user devices, such as a smart phone, watch, laptop, speaker, or other device.

FIG. 13 illustrates a schematic block diagram of an embodiment of the DSP system 136 in more detail. In an embodiment, the DSP system 136 generates a voice cancellation signal that is complementary to the voice signal, e.g., wherein the complementary relationship means the two signals are approximately 180 degrees out of phase but have approximately the same amplitude and frequency. When the two resulting acoustic signals are superimposed on each other, the resulting mixed sound waves obtain a good muffling effect.

In an embodiment, the microphone 112 in the sound muffling chamber 110 generates a voice signal that is transmitted to the DSP system 136. The DSP system 136 includes a pre-filter and/or analog to digital converter (ADC) 1310 that receives the analog voice analog and generates a digital voice signal. In another example, the pre-filter and/or ADC 1310 may alternatively be incorporated into the microphone 112.

A signal analyzer 1320 in the DSP system 136 analyzes the digital voice signal and determines the various frequency components in the digital voice signal. For example, during a conversation, the fundamental frequency of a typical voice ranges from 250 Hertz (Hz) to 4000 Hz. Table 1 below illustrates one example of the major octave bands that contribute to speech intelligibility.

| Frequency Bands in Hz | Contributions % |
|---|---|
| 250 | 5% |
| 500 | 15% |
| 1000 | 20% |
| 2000 | 30% |
| 4000 | 25% |

The DSP system 136 determines the frequency components in the digital voice signal, e.g., using a spectrum analyzer. The DSP system 136 also determines the amplitude and phase of the frequency components. For example, the signal analyzer 1320 may be a circuit or a logic unit that can extract characteristic parameters of acoustic signals by performing sampling, spectrum analysis, etc.

A signal generator 1330 in the DSP system 136 then generates a digital voice cancellation signal that includes frequency components with a same frequency and amplitude as the voice signal but at 180 degrees out of phase from the frequency components in the digital voice signal. The signal generator 1330 may include one or more of: logic units, integrated circuits, amplifiers, filters, clock circuits, etc. A post filter and digital to analog converter (DAC) 1340 converts the digital voice cancellation signal into an analog signal that is transmitted to the speaker 134. In another example, the post filter and/or DAC 1340 may be implemented within the speaker 134. The speaker 134 then generates analog sound waves in response to the digital voice cancellation signal. When the generated analog sound waves and the voice sound waves mix in the sound silencing chamber 132, the sound waves are superimposed and cancel out amplitudes of the frequency components, at least to some extent, to generate softer, unintelligible sounds.

A good voice cancelling effect can be achieved when the phase of the generated sound waves and the vocal sound waves are opposite, and the amplitude and the frequency are the same. However, the embodiments are not limited thereto, for example, at least some voice canceling effects can be achieved when the generated sound waves and the vocal sound waves have somewhat or close to opposite phase (e.g., 170 degrees to 190 degrees out of phase) and/or have approximately same or similar amplitudes and frequencies (e.g., within 10% to 20%).

In an embodiment, the generated sound waves are emitted by the speaker 134 simultaneously to, or close to, the arrival of the vocal sound waves in the sound silencing chamber 132. Since the speed of sound in air is approximately 331.5 meters/second (m/s), the sound decelerator 120 needs to increases the distance to the sound silencing chamber 132 and/or slow the sounds waves to the sound silencing chamber 132 to provide the DSP system 136 sufficient time to generate the voice cancellation signal. In one example, the time of the sound waves to reach the sound decelerator is at least 0.5 milliseconds (msec). In general, this 0.5 msec provides sufficient time for the DSP system 136 to generate the voice cancellation signal and for the speaker 134 to generate sound waves.

In an embodiment, the DSP system 136 may vary the time of transmitting the voice cancellation signal to the speaker 134 depending on a frequency component and its time to travel to the sound silencing chamber 132. For example, as shown in Table 1 below, the travel time of a sound wave depends on its frequency and wavelength. Table 1 illustrates various frequencies of a human voice, the distance of a half wavelength of the frequency, and travel time of the half wavelength.

TABLE 1

| FREQUENCY in Hz | Half Wavelength in mm | Time to travel Half Wavelength distance in msec |
|---|---|---|
| 250 | 686 | 2.0 |
| 500 | 343 | 1.0 |
| 1,000 | 172 | 0.5 |
| 2,000 | 86 | 0.25 |
| 3,000 | 57 | 0.17 |
| 4,000 | 43 | 0.13 |
| 8,000 | 21 | 0.06 |

In an embodiment, the time for various frequency components to travel to the sound silencing chamber 132 may be predetermined, e.g., through experimentation. The DSP system 136 may then vary the time of transmitting the voice cancellation signal for different frequency components depending on the predetermined travel time.

The speaker 134 in the sound silencing chamber 132 is connected to the DSP system 136 and is configured to output the generated sound waves in response to the voice cancellation signal. In the arrangement, the generated sound waves and the vocal sound waves of opposite phase should be emitted from two mutually close positions to directly superimpose without attenuation. For example, the speaker 134 should be positioned close to the audio opening from the sound decelerator 120 into the sound silencing chamber 132.

The DSP system 136, and components thereof, may be implemented by hardware circuits and/or logic circuits including a memory and processor, wherein corresponding computer readable instructions stored in the memory are executed on the processor to cause the processor to perform operations described herein.

Figure 14:
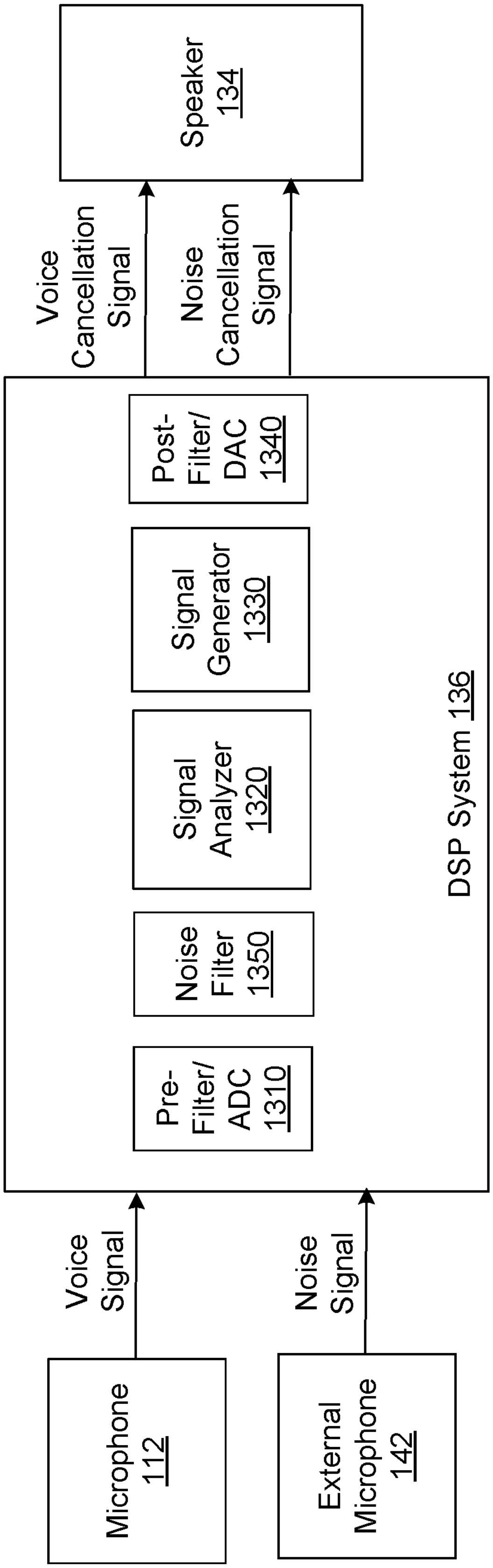
FIG. 14 illustrates a schematic block diagram of another embodiment of the DSP system in more detail

FIG. 14 illustrates a schematic block diagram of another embodiment of the DSP system 136 in more detail. In this embodiment, the DSP system 136 also compensates for ambient noise. An external microphone 142 is positioned on an external wall of the voice cancellation system 100 and/or within the air outlet 140 to detect ambient noises, such as external noises and/or sounds emitted from the terminal conduit 138. The external microphone 142 detects the ambient noises and generates a noise signal that is transmitted to the DSP system 136.

In an embodiment, the DSP system 136 processes the noise signal and generates a noise cancellation signal. For example, the DSP system 136, similar to the process for the voice signal, analyzes the noise signal and determines a plurality of frequency components in the noise signal. The DSP system 136 also determines characteristic parameters for the frequency components, such as amplitude and phase. The DSP system 136 then generates a noise cancellation signal including frequency components at a same frequency and amplitude but with an opposite phase, e.g., 180 degrees out of phase, from the frequency components in the noise signal. The noise cancellation signal is transmitted to the speaker 134 to generate sound waves to muffle the ambient noise. In this way, the voice cancellation system 100 can effectively reduce or even eliminate a volume of the user's call sound on the surrounding environment, thus preventing others from being disturbed, and preventing the content of the call from being understood by others.

In addition and/or alternatively, in an embodiment, the DSP system 136 filters ambient noise from the voice signal. The external noises and/or sounds from the sound silencing chamber 132 may travel to the voice microphone 112 in the sound muffling chamber 110. The voice microphone 112 may detect these noises along with the voice of the user. To isolate the voice sound waves from the ambient noise, the DSP system 136 may need to filter the noises from the voice signal, especially when the user is in a noisy environment such as a crowded room or on a busy street. For example, the DSP system 136 may include a noise filter 1350 that filters the noise signal from the voice signal. Though the noise filter 1350 is shown after the pre-filter/ADC 1310, the noise filter 1350 may be implemented with and/or before the pre-filter or with or after the ADC. In addition, though the noise filter 1350 is shown before the signal analyzer 1320, the noise filter 1350 may be implemented with the signal analyzer. For example, the signal analyzer 1320 can compare the characteristic parameters of the noise signal with the characteristic parameters of the voice signal, and eliminate the interference of the noise signal.

Figure 15:
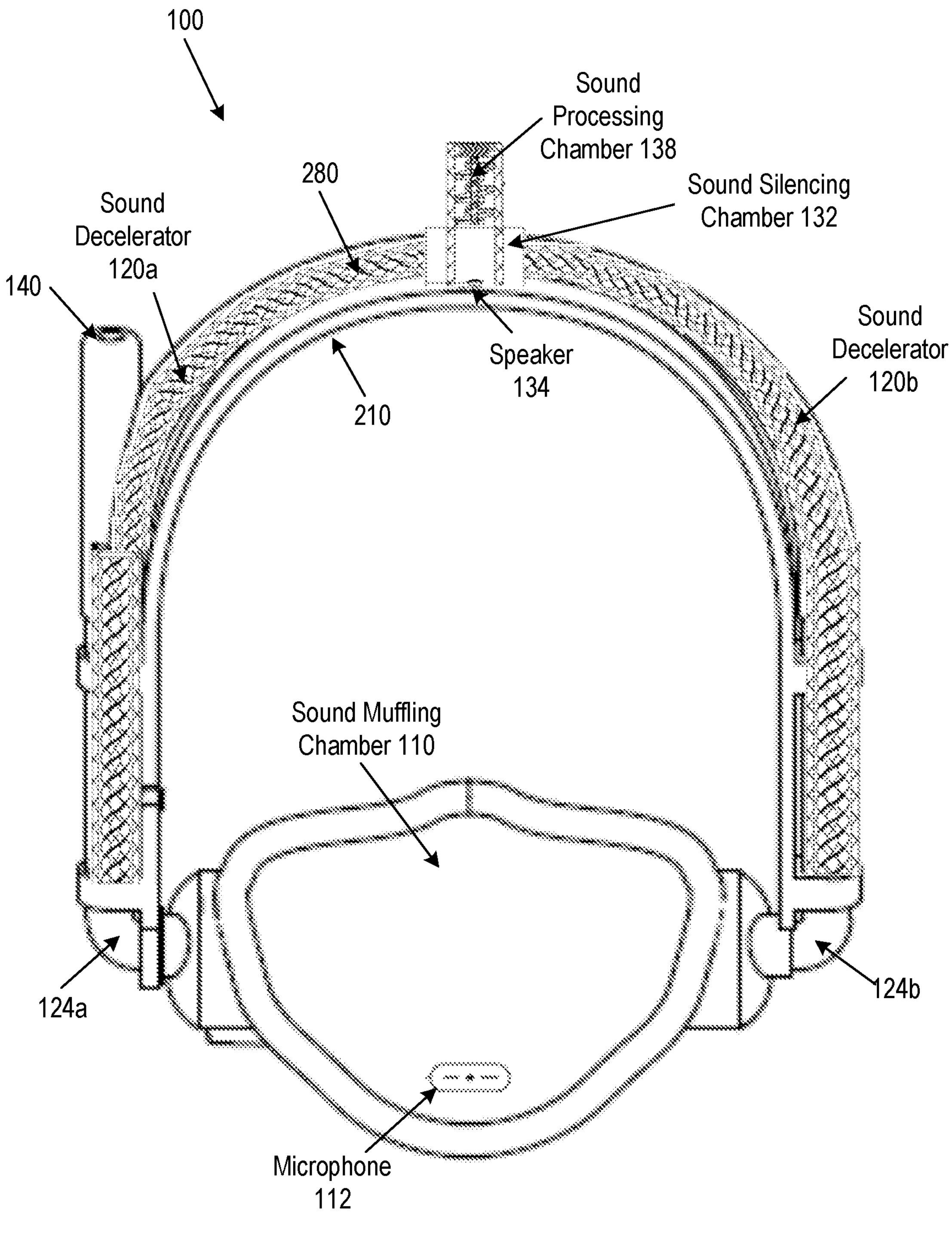
FIG. 15 illustrates a perspective view of another embodiment of the voice cancellation system.

FIG. 15 illustrates a perspective view of another embodiment of the voice cancellation system 100. In this embodiment, the sound silencing chamber 132 may be disposed in the outer headband 280 between two sound decelerators 120*a* and 120*b* located on each lateral side of the outer headband 280. In this example, the user's voice travels from two openings in opposing sides of the sound muffling chamber 110 through elbows 124*a* and 124*b* and into the two sound decelerators 120*a* and 120*b*. Placing the sound silencing chamber 132 equidistance from each sound decelerator 120*a*, 120*b* is critical so that the user's voice arrives at the same time. In this embodiment, the sound decelerators 120*a,b* may have a greater length and provide further delay for processing of the voice signal.

Figure 16A:
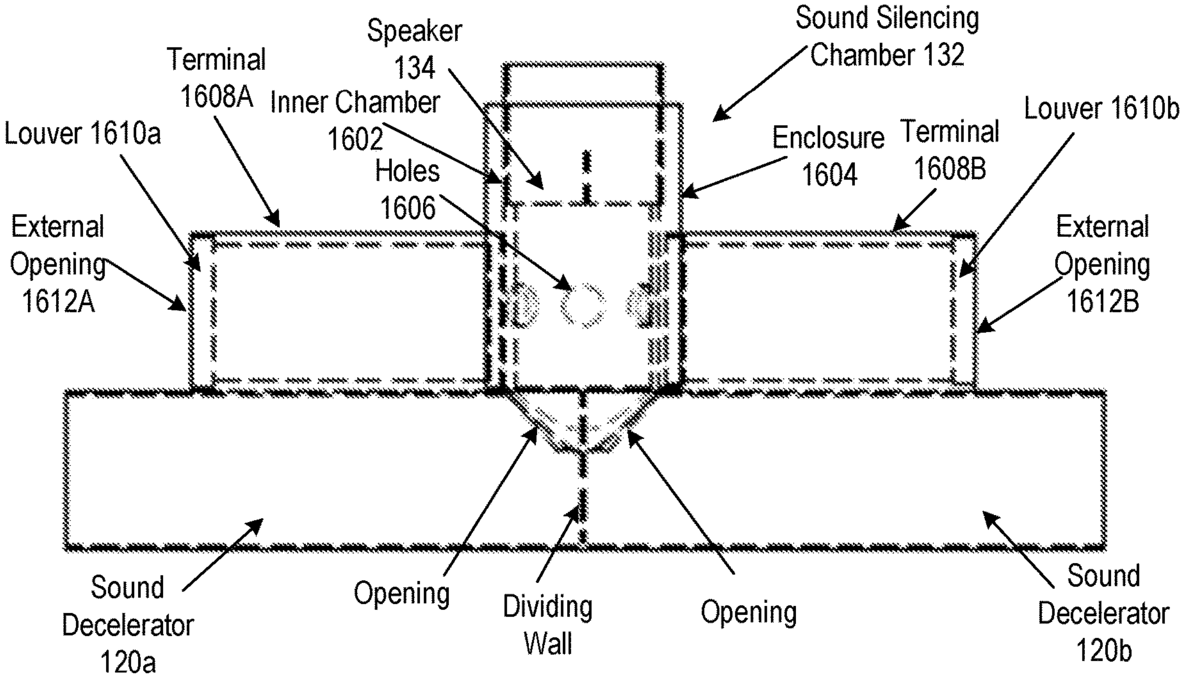
FIGS. 16A and 16B illustrate views of another embodiment of the sound silencing chamber.
Figure 16B:
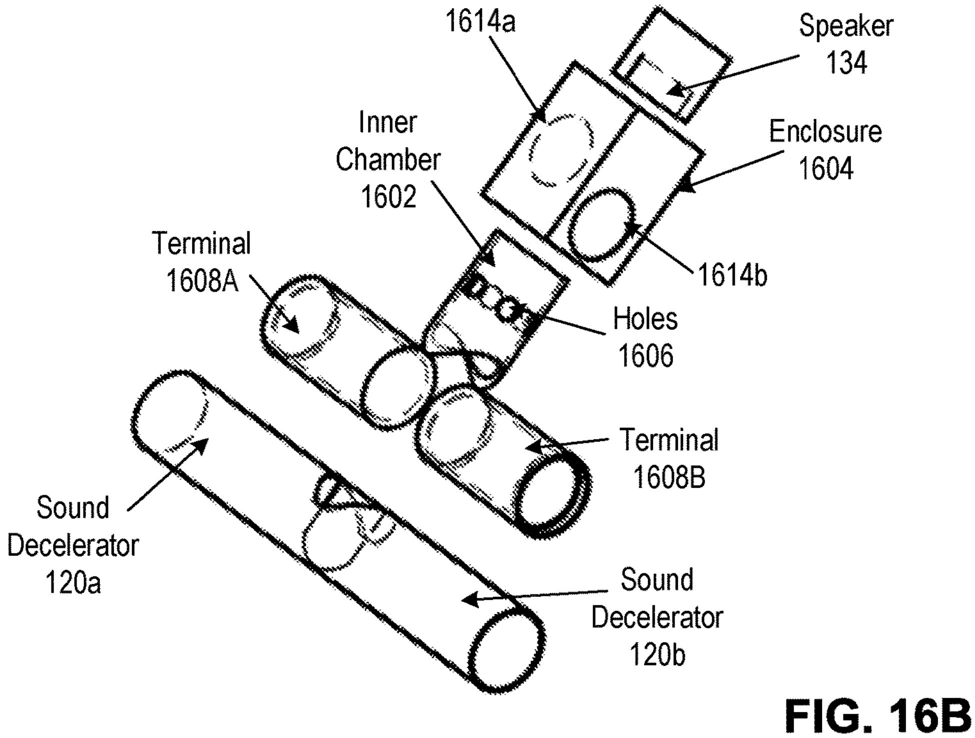

FIGS. 16A and 16B illustrate views of another embodiment of the sound silencing chamber 132, wherein FIG. 16A illustrates a side perspective view of the sound silencing chamber 132, and FIG. 16B illustrates an exploded view of components of the sound silencing chamber 132. The sound silencing chamber 132 is a small chamber where the vocal sound waves of the user's voice and the out of phase sound waves from the speaker 134 are superimposed. The sound silencing chamber 132 includes an elongated inner chamber 1602 having a tubular body with a first end fluidly coupled to the sound decelerators 120*a*, 120*b* and serving as the entry way for the vocal sound waves of the user's voice. The second end of the inner chamber 1602 includes or is fluidly coupled to the speaker 134 for broadcast of the out of phase sound waves. The user's voice thus reaches the sound silencing chamber 132 via the first sound decelerator 120*a* and the second sound decelerator 120*b*. The connector tubes of the first and second sound decelerators 120*a*, 120*b* are bent 90 degrees, the distal ends of which are brought in parallel to each other and placed on one end of the sound silencing chamber 132. The speaker 134 is positioned on the opposite end of the sound silencing chamber 132 for broadcast of the out of phase sound waves. The speaker 134, furthermore, is sized and configured to precisely mirror that of the vocal sound entry way.

The inner chamber 1602 is covered with an air-tight and/or sound proofed enclosure 1604 to prevent sound leakage. The inner chamber 1602 and enclosure 1604 may be lined with a sound absorbing material such as foam, fabric, and fibers to minimize echoing. Disposed circumferentially on the tubular body of the inner chamber 1602 at the longitudinal center point are formed one or more sound escaping holes 1606 for egress of the superimposed and cancelled sound waves into the enclosure 1604.

The cancelled sound waves escape the enclosure 1604 through openings 1614*a*, 1614*b* to terminal segments 1608*a*, 1608*b*. The terminal segments 1608*a*, 1608*b* are positioned on opposing walls of the enclosure 1604 and serve to further attenuate the cancelled sound waves and block the external sounds from entering the device. To that end, the terminal segments 1608*a*, 1608*b* may be filled with a sound absorbing material and may include external openings 1612*a*, 1612*b* with porous coverings 1610*a*, 1610*b*, such as louver, to reduce the possibility of external noise retrogradely transmitting to the sound muffling chamber 110. The external openings 1612*a*, 1612*b* and the terminal segment air passage each include at least a 7 mm diameter or greater to facilitate the user's adequate ventilation.

The maximum effects of destructive interference between the vocal sound waves and the speaker sound waves are achieved through various means: (1) The arrival time of these two sounds are synchronized; (2) The phase difference of these two sounds are set at 180 degrees; (3) The size and configuration of the two sounds' entry ways are precisely or approximately matched; (4) The two sounds' entry ways are positioned on the opposite walls of the sounds silencing chamber 132 so that the two sound waves travel directly toward each other. As such, the maximum voice cancellation occurs in the center of the sound silencing chamber 132. Through destructive interference effects of the inverted-phase sounds, the majority of the user's voice is canceled, making it unintelligible to people nearby. Targeted cancellation voice frequency includes 250, 500, 1000, 2000, 4000 Hz. With this approach, a majority (>95%) of the speaker's voice is canceled, making it unintelligible to the nearby people.

The voice cancellation system 100 described herein enhances a user's privacy and minimizes disturbance to the public. It covers the nose and the mouth of the user in an air-tight manner and detects the vocal sounds created by both the nose and the mouth of the user while allowing the user to inhale and exhale without limitations and without risking sound leakage. The sound-barrier property of the device is robust such that leaking of vocal sounds is limited through the body of the device and sufficiently elastic to accommodate the facial movement and mouth opening and closing without disrupting the air-proof seal. The device is also foldable to permit the user to conveniently carry it.

As may be used herein, the term "operable to" or "configurable to" indicates that an element includes one or more of circuits, instructions, modules, data, input(s), output(s), etc., to perform one or more of the described or necessary corresponding functions and may further include inferred coupling to one or more other items to perform the described or necessary corresponding functions. As may also be used herein, the term(s) "coupled," "coupled to," "connected to" and/or "connecting" or "interconnecting" includes direct connection or link between nodes/devices and/or indirect connection between nodes/devices via an intervening item. As may further be used herein, inferred connections (i.e., where one element is connected to another element by inference) includes direct and indirect connection between two items in the same manner as "connected to." As may be used herein, the terms "substantially" and "approximately" provides an industry-accepted tolerance for its corresponding term and/or relativity between items.

Note that the aspects of the present disclosure may be described herein as a process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various features of the disclosure described herein can be implemented in different systems and devices without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

In the foregoing specification, certain representative aspects have been described with reference to specific examples. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described. For example, the components and/or elements recited in any apparatus claims may be assembled or otherwise operationally configured in a variety of permutations and are accordingly not limited to the specific configuration recited in the claims.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

As used herein, the terms "comprise," "comprises," "comprising," "having," "including," "includes" or any variation thereof, are intended to reference a nonexclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

Moreover, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is intended to be construed under the provisions of 35 U.S.C. § 112(f) as a "means-plus-function" type element, unless the element is expressly recited using the phrase "means for" or, in the case of a method claim, the element is recited using the phrase "step for."

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer-readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

The invention claimed is:

1. A voice cancellation system, comprising:
- a sound muffling chamber configured to cover both a nose and mouth of a user, wherein the sound muffling chamber includes soundproof material;
- at least one microphone positioned in the sound muffling chamber, wherein the at least one microphone is configured to detect a voice of the user in the sound muffling chamber and generate a voice signal;
- a sound silencing chamber, wherein the sound silencing chamber includes at least one speaker;
- at least one sound decelerator fluidly coupled between the sound muffling chamber and the sound silencing chamber, wherein the sound decelerator includes material to increase a traveling time of sound waves from the sound muffling chamber to the sound silencing chamber;
- a signal processing system configured to analyze the voice signal and generate a digital voice cancellation signal, wherein the voice cancellation signal includes one or more frequency components having a same frequency and amplitude but a 180 degrees out of phase from one or more frequency components of the voice signal; and
- wherein the speaker generates analog sound waves in the sound silencing chamber in response to the digital voice cancellation signal.

2. The voice cancellation system of claim 1, wherein the sound muffling chamber further comprises:
- a plurality of slats;
- a spring positioned centrally to the plurality of slats, wherein each of the plurality of slats includes at least a portion positioned in a different coil of the spring;
- a plurality of inflatable air cells, wherein each of the plurality of inflatable air cells is positioned between a different pair of the plurality of slats; and
- an airtight enclosure that encloses at least the plurality of slats and the plurality of inflatable air cells.

3. The voice cancellation system of claim 2, wherein in a deflated state, the spring compresses the plurality of slats together and each of the plurality of inflatable air cells is deflated and folded between the different pair of the plurality of slats.

4. The voice cancellation system of claim 3, wherein the sound muffling chamber further comprises:
- a lock configured to hold the spring in an extended state; and
- wherein in an inflated state, the spring is in the extended state and pushes the plurality of slats apart and each of the plurality of inflatable air cells is inflated and extends between the different pair of the plurality of slats.

5. The voice cancellation system of claim 4, wherein the sound muffling chamber further comprises:
- an inner wall coated with a sound-absorbing material; and
- an outer wall, wherein the inner and outer wall are part of the air-tight enclosure enclosing at least the plurality of slats and the plurality of inflatable air cells.

6. The voice cancellation system of claim 2, further comprising:
- an air inlet pipe fluidly coupled to the plurality of inflatable air cells; and
- an air valve coupled to the air inlet pipe, wherein in an open position, the air valve fluidly couples the air inlet pipe to an air source and in a closed position, fluidly decouples the air inlet pipe from the air source.

7. The voice cancellation system of claim 1, further comprising:

an outer headband rotatably coupled to the sound muffling chamber such that the outer headband rotates between 90 degrees to 180 degrees from a horizontal plane with respect to the sound muffling chamber.

8. The voice cancellation system of claim 1, further comprising:

an elbow-shaped connector tube with a first end fluidly coupled to the sound muffling chamber, and a second end fluidly coupled to the at least one sound decelerator.

9. The voice cancellation system of claim 1, wherein the sound muffling chamber further comprises:

an inner rim contoured to fit over the mouth and the nose of the user, wherein the inner rim includes an elastic material to create an air-tight seal with a skin of the user.

10. A voice cancellation system, comprising:

a sound muffling chamber configured to cover both a nose and mouth of a user, wherein the sound muffling chamber includes soundproof material;

at least one microphone positioned in the sound muffling chamber, wherein the at least one microphone is configured to detect voice sound waves of the user in the sound muffling chamber and generate a voice signal;

a headband coupled to the sound muffling chamber, wherein the headband includes a tubular structure configured to extends circumferentially from the sound muffling chamber over a head of the user;

a sound silencing chamber positioned near an apex of the headband, wherein the sound silencing chamber includes at least one speaker;

at first sound decelerator in a left side of the tubular structure of the headband, wherein the first sound decelerator is fluidly coupled between a left side of the sound muffling chamber and the sound silencing chamber;

a second sound decelerator in a right side of the tubular structure of the headband, wherein the second sound decelerator is fluidly coupled between a right side of the sound muffling chamber and the sound silencing chamber;

a signal processing system configured to analyze the voice signal and generate a voice cancellation signal; and wherein the at least one speaker generates analog sound waves in the sound silencing chamber in response to the digital voice cancellation signal.

11. The voice cancellation system of claim 10, wherein the first sound decelerator includes at least one first tortuous sound conduit that may be filled with sound retarding materials to increase a traveling time of the voice sound waves from the left side of the sound muffling chamber to the sound silencing chamber;

wherein the second sound decelerator includes at least one second tortuous sound conduit that may be filled with porous sound retarding materials to increase a traveling time of the voice sound waves from the right side of the sound muffling chamber to the sound silencing chamber;

wherein the increase of sound transmission time through each of the first and second decelerators is at least the time required for the signal processing system to process the voice signal and produce the voice cancellation signal in the sound silencing chamber;

wherein the at least first one tortuous sound conduit and the at least second one tortuous sound conduit may each be of spiral, convoluted, zigzag, helical, wavy, or labyrinthine pattern; and wherein each of the first and second decelerators are enclosed with a soundproof enclosure.

12. The voice cancellation system of claim 10, wherein the signal processing system is configured to:

determine a plurality of voice frequency components in the voice signal;

determine an amplitude and phase for each of the plurality of voice frequency components; and generate the voice cancellation signal including a plurality of cancellation frequency components, wherein each of the plurality of cancellation frequency components has a same frequency and amplitude but is a 180 degrees out of phase from at least one of the plurality of voice frequency components; and wherein the at least one speaker generates sound waves in the sound silencing chamber in response to the voice cancellation signal to muffle the voice sound waves.

13. The voice cancellation system of claim 10, wherein the sound silencing chamber, comprises:

an inner chamber having a tubular body, wherein a first lateral portion of the inner chamber is fluidly coupled to the first sound decelerator and the second sound decelerator and wherein a second lateral portion of the inner chamber includes the at least one speaker; and wherein one or more holes are formed centrally of the tubular body of the inner chamber for air flow.

14. The voice cancellation system of claim 13, wherein the sound silencing chamber further comprises:

a sound proofed enclosure around at least a portion of the inner chamber, wherein the sound proofed enclosure forms a first opening and a second opening, wherein the first opening is fluidly coupled to a first terminal conduit and the second opening is fluidly coupled to a second terminal conduit;

wherein the conduit forms one or more holes fluidly coupled to the first opening and the second opening of the conduit enclosure.

15. The voice cancellation system of claim 14, wherein the first terminal conduit and the second terminal conduit are positioned on opposing sides of the sound proofed enclosure and wherein each of the first terminal conduit and the second terminal conduit include external openings;

wherein the first terminal conduit and the second terminal conduit include a tortuous structure and are filled with porous sound retarding materials; and wherein the external openings of the first terminal conduit and the second terminal conduit each include a porous cover.

16. The voice cancellation system of claim 10, wherein the sound muffling chamber further comprises:

a plurality of slats;

a spring positioned centrally to the plurality of slats, wherein each of the plurality of slats includes at least a portion positioned in a different coil of the spring; and a plurality of inflatable air cells, wherein each of the plurality of inflatable air cells is positioned between a different pair of the plurality of slats.

17. The voice cancellation system of claim 16, wherein in a deflated state, the spring compresses the plurality of slats together and each of the plurality of inflatable air cells is deflated and folded between the different pair of the plurality of slats.

18. The voice cancellation system of claim 17, wherein the sound muffling chamber further comprises:

a lock configured to hold the spring in an extended state; and wherein in an inflated state, the spring is in the extended state and pushes the plurality of slats apart and each of the plurality of inflatable air cells is inflated and extends between the different pair of the plurality of slats.

19. The voice cancellation system of claim 18, further comprising:

an air inlet pipe fluidly coupled to the plurality of inflatable air cells;

an air valve coupled to the air inlet pipe, wherein in an open position, the air valve fluidly couples the air inlet pipe to an air source and in a closed position, fluidly decouples the air inlet pipe from the air source; and a pressure gauge fluidly coupled to the air inlet pipe and/or the air valve, wherein the pressure gauge measures an air pressure in the plurality of inflatable air cells.

* * * * *